United States Patent
Chen et al.

(10) Patent No.: US 12,483,325 B2
(45) Date of Patent: Nov. 25, 2025

(54) ADAPTIVE CONSTELLATION FOR TRANSMODULATION IN SATELLITE COMMUNICATION SYSTEMS

(71) Applicant: Hughes Network Systems, LLC, Germantown, MD (US)

(72) Inventors: Liping Chen, Bethesda, MD (US); Rohit Iyer Seshadri, Gaithersburg, MD (US); Stanley Kay, Rockville, MD (US); Lin-nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 302 days.

(21) Appl. No.: 18/140,663

(22) Filed: Apr. 28, 2023

(65) Prior Publication Data
US 2023/0403071 A1    Dec. 14, 2023

Related U.S. Application Data

(60) Provisional application No. 63/351,300, filed on Jun. 10, 2022.

(51) Int. Cl.
*H04B 7/185* (2006.01)
*H04B 17/336* (2015.01)
(Continued)

(52) U.S. Cl.
CPC ....... *H04B 7/18526* (2013.01); *H04B 17/336* (2015.01); *H04L 27/3405* (2013.01); *H04W 88/16* (2013.01)

(58) Field of Classification Search
CPC .............. H04B 7/18526; H04B 17/336; H04B 7/18513; H04B 7/18517; H04B 7/18543; H04L 27/3405; H04W 88/16
See application file for complete search history.

(56) References Cited

U.S. PATENT DOCUMENTS 7,173,977 B2    2/2007   Chen et al.
7,512,198 B2    3/2009   Strodtbeck et al.
(Continued)

FOREIGN PATENT DOCUMENTS

GB          2538791          11/2016
WO    WO 2004/040820         5/2004
WO    WO 2019/073029         4/2019

OTHER PUBLICATIONS

International Search Report and Written Opinion in International Appln. No. PCT/US2023/024952, mailed on Nov. 22, 2023, 24 pages.

(Continued)

*Primary Examiner* — Abdullahi Ahmed
(74) *Attorney, Agent, or Firm* — Kilpatrick Townsend & Stockton LLP

(57) ABSTRACT

Methods, systems, and apparatus for transmodulation in multi-beam satellite communication systems. In some implementations, a gateway receives bitstreams for transmission on different forward links from a satellite to terminals. The gateway is configured to modulate data for transmission on a feeder link for transmissions from the gateway to a satellite, including using a same symbol constellation to modulate data to provide different numbers of bits per symbol. The gateway can be configured to select symbols for transmission from among different subsets of the symbols in the symbol constellation to achieve different numbers of bits per symbol. The gateway can also be configured to select symbols for transmission from among one of the subsets determined based at least in part on a measure of signal strength for the feeder link.

20 Claims, 14 Drawing Sheets

(51) Int. Cl.
*H04L 27/34* (2006.01)
*H04W 88/16* (2009.01)

(56) References Cited

U.S. PATENT DOCUMENTS

| | | | |
|---|---|---|---|
| 7,979,024 | B2 | 7/2011 | Zheng |
| 8,831,122 | B2 | 9/2014 | Zheng |
| 9,553,754 | B1 | 1/2017 | Dorosenco et al. |
| 10,411,941 | B2 | 9/2019 | Suh et al. |
| 10,887,003 | B2 | 1/2021 | Buer et al. |
| 11,444,686 | B2 | 9/2022 | Chen et al. |
| 11,876,598 | B2 | 1/2024 | Chen et al. |
| 2002/0026643 | A1 | 2/2002 | Ewen et al. |
| 2009/0073917 | A1 | 3/2009 | Anderson et al. |
| 2014/0056335 | A1 | 2/2014 | Ryu et al. |
| 2017/0324468 | A1* | 11/2017 | Lee ................... H04B 7/1858 |
| 2019/0132044 | A1 | 5/2019 | Hreha et al. |
| 2019/0132750 | A1 | 5/2019 | Yaghmour et al. |
| 2019/0229836 | A1 | 7/2019 | Perotti |
| 2020/0322042 | A1 | 10/2020 | Rainish |
| 2020/0322044 | A1* | 10/2020 | Knopp ................ H04B 7/0413 |
| 2022/0209851 | A1* | 6/2022 | Chen ................... H04L 27/364 |
| 2022/0368413 | A1* | 11/2022 | Chen ................ H04B 7/18515 |
| 2023/0189088 | A1* | 6/2023 | Shin .................. H04B 7/18513 455/427 |
| 2025/0158711 | A1* | 5/2025 | Hariq ................ H04B 7/18504 |

OTHER PUBLICATIONS

Invitation to Pay Additional Fees in International Appln. No. PCT/US2023/024952, mailed on Sep. 29, 2023, 20 pages.

Zoellner et al., "Optimization of high-order non-uniform QAM constellations," Presented at the Proceedings of the IEEE International Symposium on Broadband Multimedia Systems and Broadcasting, London, England, UK, Jun. 5-7, 2013, 1-6.

International Preliminary Report on Patentability in International Appln. No. PCT/US2023/024952, mailed on Dec. 19, 2024, 18 pages.

[No Author Listed], "Satellite Earth Stations and Systems; Air Interface for S-band Mobile Interactive Multimedia (S-MIM); Part 1: General System Architecture and Configurations," ETSI, Dec. 2011, 1.1.1:1-46.

Divsalar et al., "Performance of a Coded Non-Square Quadrature Amplitude Modulation Scheme over Fading Channels," IPN Progress Report, Feb. 2004, 1-17.

Gharanjik et al., "Spatial Multiplexing in Optical Feeder Links for High Throughput Satellites," Presented at the Proceedings of the IEEE Global Conference on Signal and Information Processing, Atlanta, Georgia, USA, Dec. 3-5, 2014, 5 pages.

Honnaiah et al., "Demand-driven Beam Densification in Multi-Beam Satellite Communication Systems," IEEE Transactions on Aerospace and Electronic Systems, May 2023, 1-20.

Joroughi et al., "Precoding in Multigateway Multibeam Satellite Systems," CoRR, Submitted on Jul. 2015, arVix:1507.00159, 26 pages.

Li et al., "Iterative Demodulation, Demapping, and Decoding of Coded Non-Square QAM," IEEE Transactions on Communications, Jan. 2005, 53(1):16-19.

Thibault et al., "Joint feeder-link bandwidth compaction and interference mitigation based on a hybrid space/ground processing architecture for a broadband multi-beam satellite system," International Journal of Satellite Communications and Networking, Aug. 2013, 32(2):107-125.

\* cited by examiner

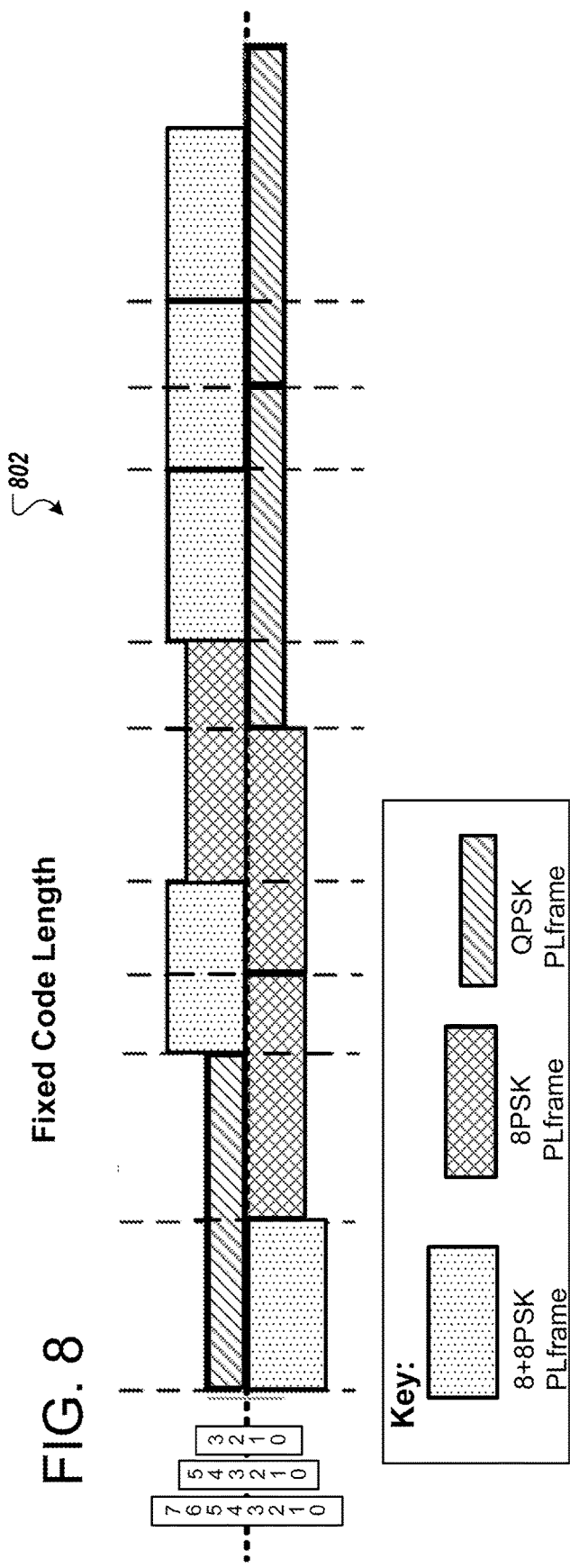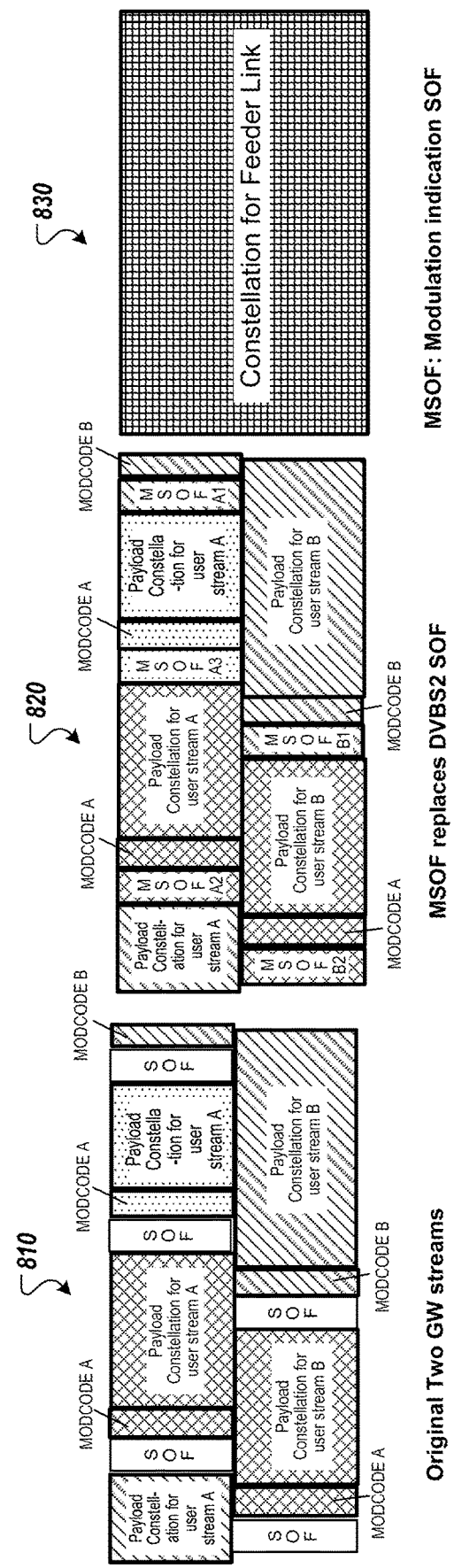
FIG. 8

910

```
Transmod26dB_MODCODE=
[{4.66, 'QPSK 4/5',            4/5,      2};
 {5.1,  '8PSK 100/180',        100/180,  3};
 {5.55, '8PSK 26/45',          26/45,    3};
 {5.9,  '8PSK 3/5',            3/5,      3};
 {6.5,  '8+8PSK 1/2',          1/2,      4};
 {6.95, '8+8PSK 96/180',       96/180,   4};
 {7.35, '8+8PSK 100/180',      100/180,  4};
 {7.70, '8+8PSK 26/45',        26/45,    4};
 {8.11, '8+8PSK 3/5',          3/5,      4};
 {8.32, '8+8PSK 28/45',        28/45,    4};
 {8.7,  '8+8PSK 23/36',        23/36,    4};
 {9.20, '8+8PSK 2/3',          2/3,      4};
 {9.75, '8+8PSK 25/36',        25/36,    4};
 {10.15,'8+8PSK 13/18',        13/18,    4};
 {10.88,'8+8PSK 3/4',          3/4,      4};
 {11.45,'8+8PSK 7/9',          7/9,      4};
 {12.10,'8+8PSK 4/5',          4/5,      4};
 {13.00,'8+8PSK 5/6',          5/6,      4};
 {13.95,'8+8PSK 154/180',      154/180,  4};
]; UserRXSNR, MODCODE, rate, bps
```

920

```
Transmod23dB_MODCODE=
[{4.66, 'QPSK 4/5',            4/5,      2};
 {5.17, '8PSK 100/180',        100/180,  3};
 {5.59, '8PSK 26/45',          26/45,    3};
 {5.94, '8PSK 3/5',            3/5,      3};
 {6.32, '8PSK 23/36',          23/36,    3};
 {6.77, '8PSK 2/3',            2/3,      3};
 {7.30, '8PSK 25/36',          25/36,    3};
 {7.66, '8PSK 13/18',          13/18,    3};
 {8.13, '8PSK 3/4',            3/4,      3};
 {8.62, '8PSK 7/9',            7/9,      3};
 {8.95, '8PSK 4/5',            4/5,      3};
 {9.52, '8PSK 5/6',            5/6,      4};
 {10.1, '8+8PSK 23/36',        23/36,    3};
 {10.85,'8PSK 8/9',            8/9,      3};
 {11.30,'8PSK 9/10',           9/10,     3};
 {11.8, '8+8PSK 25/36',        25/36,    4};
 {12.8, '8+8PSK 13/18',        13/18,    4};
 {15.5, '8+8PSK 3/4',          3/4,      4};
]; UserRXSNR, MODCODE, rate, bps
```

930

```
Transmod20dB_MODCODE=
[{4.66, 'QPSK 4/5',            4/5,      2};
 {5.85, '8PSK 100/180',        100/180,  3};
 {6.25, '8PSK 26/45',          26/45,    3};
 {6.45, '8PSK 3/5',            3/5,      3};
 {7.10, '8PSK 23/36',          23/36,    3};
 {7.65, '8PSK 2/3',            2/3,      3};
 {8.00, '8PSK 25/36',          25/36,    3};
 {8.60, '8PSK 13/18',          13/18,    3};
 {9.55, '8PSK 3/4',            3/4,      3};
 {9.93, '8PSK 7/9',            7/9,      3};
 {10.65,'8PSK 4/5',            4/5,      3};
]; UserRXSNR, MODCODE, rate, bps
```

FIG. 9

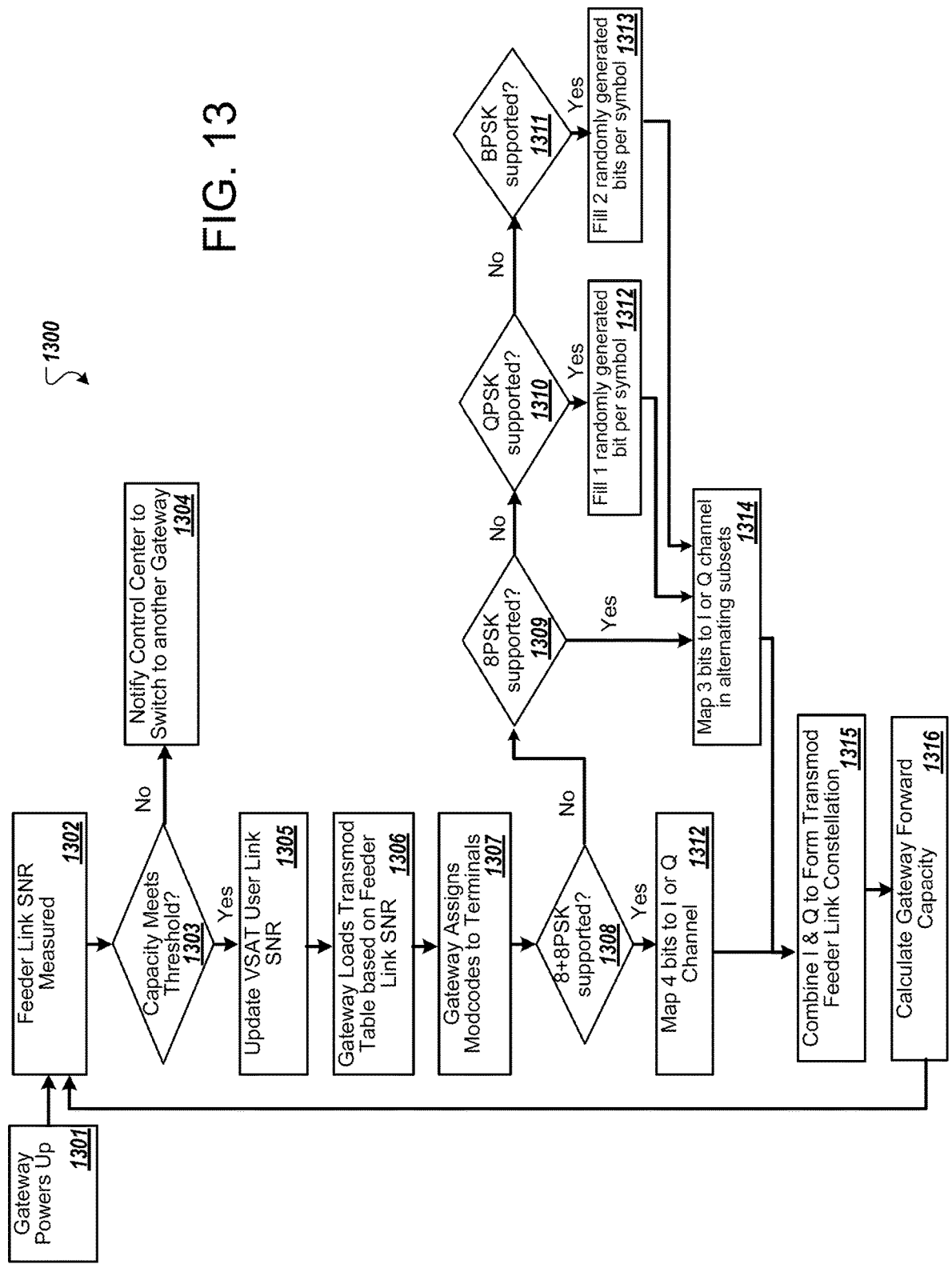

ADAPTIVE CONSTELLATION FOR TRANSMODULATION IN SATELLITE COMMUNICATION SYSTEMS

CROSS-REFERENCE TO RELATED APPLICATIONS

This application claims the benefit of priority to U.S. Provisional Patent Application No. 63/351,300, filed on Jun. 10, 2022, the contents of which are incorporated by reference herein.

BACKGROUND

In satellite communication systems, signal quality (e.g., signal-to-noise ratio (SNR), signal-to-interference-plus-noise ratio (SINR)), etc.) is typically lower for signal transmission from a satellite to user equipment than for transmission from a gateway system to the satellite. This difference can be due at least in part to the relatively low transmission power and antenna gain of the satellite compared to the higher transmission power of a gateway and the greater gain on the gateway's forward link antenna.

In a "bent-pipe" satellite transmission system, a modulated data stream transmitted to the satellite by a gateway is retransmitted by the satellite to user equipment (UE) with no or minimal processing being performed on the modulated data stream by the satellite. Therefore, the modulation used for communication between the satellite and UE can be required to be the same as the modulation between the gateway and the satellite. However, signal conditions of the UE may require a modulation with lower throughput than the connection between gateway and satellite can support. As a result, requiring the same modulation for both sections of the forward link may limit the spectral efficiency of the connection between gateway and satellite, which may not transmit with the full throughput that conditions support.

SUMMARY

In some implementations, a satellite communication system performs forward-link transmodulation, for example, where the modulation used for the forward feeder link from a gateway to a satellite can be different from the modulation used for the forward user links from the satellite to terminals or other UE. The system can include a gateway system that includes a forward feeder link creator. The creator can receive a first data stream for a first forward link signal and a second data stream for a second forward link signal. The creator can modulate the first data stream and the second data stream into a higher-order modulation forward feeder link having a higher-order digital modulation scheme. A transmitter may transmit the higher-order modulation forward feeder link to a satellite. The satellite can include a receiver that receives the higher-order modulation forward feeder link. The satellite can include a demodulator that demodulates the higher-order modulator forward feeder link into a raw bit stream. The satellite can include a bit slicer component that separates the raw bit stream into a first bit stream and a second bit stream. The satellite can include a modulator that modulates the first bit stream into a first user equipment (UE) forward link having a first lower-order digital modulation scheme and the second bit stream into a second UE forward link having a second lower-order digital modulation scheme. The higher-order digital modulation scheme is higher order modulation than the first lower-order digital modulation scheme and the second lower-order digital modulation scheme.

To facilitate transmodulation, a universal constellation can be used to reduce complexity of the transmodulator system and maintain good performance. The universal constellation can represent a high-order modulation that provides a desired maximum throughput when the feeder link SINR is sufficient. For example, the universal constellation can be 256-ary quadrature amplitude modulation (256-QAM), which has 256 symbols. If the feeder link SINR is sufficiently high to support accurate reception of each symbol, then the 256-QAM would permit 8 bits per symbol (bps) to be transmitted. Nevertheless, the same constellation can be used to transmit at lower throughput to account for lower SINR. For example, if the feeder link SINR would not support more than the 7 bps of 128-QAM, then a subset of the 256 symbols of the universal constellation can be used to simulate or approximate 128-QAM. For example, alternating rows or columns of the 256-QAM universal constellation can be used so that the gateway transmits using only 128 of the 256 symbols in the universal constellation. This provides the effect of enforcing additional spacing among the portions of the universal constellation that are actually used for transmission, while still using symbols defined in the fixed universal constellation. Similarly, if the feeder link SINR does not support more than 6 bps of a conventional 64-QAM, the gateway can again use a limited subset of the symbols in the universal constellation to simulate or approximate 64-QAM. For example, transmission can be limited to 64 symbols selected from the universal constellation, where the symbols in the subset are spaced apart evenly in the constellation (e.g., spaced apart in both in-phase and quadrature axes) to allow for greater margin in reception. Various different subsets of the universal constellation can be used to support communication at different SINR levels.

The universal constellation technique allows a single, fixed feeder link constellation to be used even for different levels of feeder link SINR and user link SINR. Using a single, fixed feeder link constellation helps to reduce demodulator signal processing on the satellite to recover the raw bits. In some implementations, when a fixed feeder link constellation is known in advance and is used consistently, the satellite does not need the capability to detect or switch between different modulations. In addition, using a single feeder link constellation also helps to reduce the number of digital predistortion (DPD) training cases at the satellite gateway and the number of sets of coefficients to be loaded for different operation points of a high power amplifier (HPA). As a result, using a universal constellation can reduce the complexity of the transmodulation system both in terrestrial gateway operations and on-satellite signal processing.

Transmodulation systems can include various features. For example, a forward feeder link creator can include (i) a first modulator that modulates a first data stream using a first lower-order digital modulation scheme and (ii) a second modulator that modulates the second data stream using the second lower-order digital modulation scheme. The forward feeder link creator can include: a first raw bit stream creator that receives a first output of the first modulator and outputs a first raw bit stream; and a second raw bit stream creator that receives a second output of the second modulator and outputs a second raw bit stream. The forward feeder link creator can include a feeder link modulator that modulates the first raw bit stream and the second raw bit stream into the higher-order modulation forward feeder link having the higher-order digital modulation scheme.

In the system, the satellite can include a transmitter that transmits signals for the first forward link and signals for the second forward link. The transmitter can transmit signals on the first forward link to a different geographical region than the second forward link. The transmitter can transmit signals on the first forward link to a same geographical region as the second forward link. The first lower-order digital modulation scheme and the second lower-order digital modulation scheme can be a same modulation scheme that is different from the higher-order digital modulation scheme. The first lower-order digital modulation scheme and the second lower-order digital modulation scheme can be different modulation schemes that are additionally different than the higher-order digital modulation scheme.

In some implementations, the system can use a fixed code length for the first lower-order digital modulation scheme and the second lower-order digital modulation scheme. In some implementations, the system can use a fixed frame length for the first lower-order digital modulation scheme and the second lower-order digital modulation scheme. The gateway system can be a gateway to the Internet. The first data stream and the second data stream can include data received by the gateway from the Internet being transmitted by remote server system to UE via the first data stream and the second data stream. The higher-order digital modulation scheme can be 256 QAM or even higher order modulation.

In some implementations, a method for performing transmodulation of a forward feeder link is performed. The method can include receiving a first data stream for a first forward link signal and a second data stream for a second forward link signal. The method can include modulating the first data stream and the second data stream into a higher-order modulation forward feeder link having a higher-order digital modulation scheme. The method can include receiving, by a satellite, the higher-order modulation forward feeder link. The method can include demodulating, by the satellite, the higher-order modulator forward feeder link into a raw bit stream. The method can include separating, by the satellite, raw bit stream into a first bit stream and a second bit stream. The method can include modulating, by the satellite, the first bit stream into a first user equipment (UE) forward link having a first lower-order digital modulation scheme and the second bit stream into a second forward link having a second lower-order digital modulation scheme. The higher-order digital modulation scheme uses higher order modulation than the first lower-order digital modulation scheme and the second lower-order digital modulation scheme.

In some implementations, the first data stream can be modulated using the first lower-order digital modulation scheme. The second data stream can be modulated using the second lower-order digital modulation scheme. A first raw bit stream can be created based on the modulated first data stream. A second raw bit stream can be created based on the modulated second data stream. The method can include modulating the first raw bit stream and the second raw bit stream into the higher-order modulation forward feeder link having the higher-order digital modulation scheme. The method can include transmitting, by a satellite, the first forward link to a different geographical region than the second forward link. The method can include transmitting, by a satellite, the first forward link to a same geographical region as the second forward link. The first lower-order digital modulation scheme and the second lower-order digital modulation scheme can be a same modulation scheme but is different than the higher-order digital modulation scheme.

In one general aspect, a gateway for a satellite communication system includes: a data input interface configured to receive (i) a first bitstream for transmission on a first forward link from a satellite to a first terminal and (ii) a second bitstream for transmission on a second forward link from the satellite to a second terminal; a modulator configured to map data to symbols for transmission on a feeder link for transmissions from the gateway to a satellite, wherein the modulator is configured to use a same symbol constellation to modulate data for transmission on the feeder link to achieve each of multiple different numbers of bits per symbol, including by selecting symbols for transmission from among different subsets of the symbols in the symbol constellation to achieve different numbers of bits per symbol, wherein the modulator is configured to (i) select data to map to a symbol for transmission on the feeder link, the selected data including a portion of the first bitstream and a portion of the second bitstream, and (ii) select a symbol to represent the selected data in a transmission on the feeder link, the symbol being selected from among a subset of the symbols in the symbol constellation and the subset is determined based at least in part on a measure of signal strength for the feeder link; and a transmitter to transmit the selected symbol on the feeder link from the gateway to the satellite.

In some implementations, the gateway is configured to remove start-of-frame (SOF) field values from the first bitstream and the second bitstream; and the gateway is configured to insert, in place of the SOF field values, replacement SOF field values that indicate modulations to use in transmitting data on the forward links.

In some implementations, the gateway is configured transmit frames having a same frame length, such that beginning positions of frames for the first bitstream and the second bitstream are aligned in the feeder link; and the replacement SOF field values are feeder link SOF field values, and the gateway is configured to use a single feeder link SOF field value in place of a first SOF field value for the first bitstream and a second SOF field value for the second bitstream. The feeder link SOF field values are selected from among a set of multiple different predetermined feeder link SOF field values, wherein each of at least some of the predetermined feeder link SOF field values represent different modulations to be used for the forward links.

In some implementations, gateway is configured transmit frames having a same code length, such that a length of codewords is the same for the forward links; and the replacement SOF field values are modulation-indicating field values, and the gateway is configured to replace individual SOF field values with modulation-indicating SOF field values, wherein the modulation-indicating SOF field values for different forward links transmitted at different times in at least some of the transmissions on the feeder link.

In some implementations, the data input interface is configured to receive more than two bitstreams for transmission on separate forward links from the satellite; and the modulator is configured to map data from the more than two bitstreams to symbols for transmission on the feeder link, such that individual symbols transmitted on the feeder link include data from each of the more than two bitstreams.

In some implementations, the measure of signal strength is a measure of signal-to-noise ratio (SNR) or signal-to-interference-and-noise ratio (SINR).

In some implementations, the gateway is configured to transmit symbols on the feeder link in a transmodulation system in which transmissions on the feeder link are used by the satellite to transmit data on the first forward link and/or the second forward link, wherein the transmission on the feeder link is made using a modulation that is different from modulations concurrently used for the first forward link and the second forward link.

In some implementations, the first forward link is provided by a first beam of the satellite and the second forward link is provided by a second beam of the satellite.

In some implementations, the gateway comprises one or more processors configured to (i) determine a first number of bits per symbol used in a modulation for the first forward link and (ii) determine a second number of bits per symbol used in a modulation for the second forward link; and the modulator is configured to determine the subset of the symbols of the symbol constellation based in part on the determined first number of bits per signal and the determined second number of bits per symbol.

In some implementations, the gateway comprises one or more processors configured to (i) select a first modulation for transmission of the first bitstream on the first forward link based on a measure of signal strength for the first forward link and (ii) select a second modulation for transmission of the second bitstream on the second forward link based on a measure of signal strength for the second forward link; and the gateway is configured to specify, in a transmission on the feeder link, the selected first modulation for the first forward link and the selected second modulation for the second forward link.

In some implementations, the symbol constellation is for a modulation providing a maximum of a first number of bits per symbol, and the system is configured to approximate multiple lower-order modulations that provide fewer than the first number of bits per symbol using proper subsets of the symbols in the symbol constellation.

In some implementations, the symbol constellation provides a maximum number of bits per symbol, and wherein the modulator is configured to select from different subsets of the symbols in the symbol constellation to approximate transmission with modulations having less than the maximum number of bits per symbol.

In some implementations, the subsets used to approximate transmission with modulations having less than the maximum number of bits per symbol each omit rows and/or columns of the symbol constellation to provide space between symbols included in the subset.

In some implementations, to achieve a number of bits per symbol lower than the maximum number of bits per symbol, the modulator is configured to map data to symbols in a manner that alternates between selecting from different distinct subsets of the symbol constellation.

In some implementations, the modulator is configured to alternate between selecting from different distinct subsets of the symbol constellation such that, for each symbol in a sequence of symbols output by the modulator, each symbol is selected from a different one of the distinct subsets than was used to select the previous symbol output by the modulator.

In some implementations, the symbol constellation is a symbol constellation for quadrature amplitude modulation (QAM) having a particular number of symbols and providing a maximum of a particular number of bits per symbol; and the modulator is configured to selectively modulate data for transmission on the feeder link using fewer than the particular number of bits per symbol, including by: modulating data using the symbol constellation to provide one bit per symbol less than the particular number of bits per symbol when first criteria for the signal strength of the feeder link are satisfied, including by alternating among selection of symbols for transmission on the feeder link from among first non-overlapping subsets of the symbols in the symbol constellation, wherein each of the first non-overlapping subsets have half of the particular number of symbols; and modulating data using the symbol constellation to provide two bits per symbol less than the particular number of bits per symbol when second criteria for the signal strength of the feeder link are satisfied, including by alternating among selection of symbols for transmission on the feeder link from among second non-overlapping subsets of the symbols in the symbol constellation, wherein each of the second non-overlapping subsets have one quarter of the particular number of symbols.

In some implementations, the symbol constellation has an unequal spacing of symbols in which amounts of spacing between symbols increase as distance increases from a center of the constellation.

In another general aspect, a method performed by a gateway of a satellite communication system includes: receiving, by the gateway, (i) a first bitstream for transmission on a first forward link from a satellite to a first terminal and (ii) a second bitstream for transmission on a second forward link from the satellite to a second terminal; selecting, by the gateway, data to map to a symbol for transmission on a feeder link for transmissions from the gateway to a satellite, and wherein the selected data includes a portion of the first bitstream and a portion of the second bitstream; selecting, by the gateway, a symbol to represent the selected data in a transmission on the feeder link, the symbol being selected from among a subset of the symbols in a symbol constellation and the subset is determined based at least in part on a measure of signal strength for the feeder link, wherein the gateway is configured to use the symbol constellation to modulate data for transmission on the feeder link to achieve different numbers of bits per symbol, and wherein the gateway is configured to select symbols for transmission from among different subsets of the symbols in the symbol constellation to achieve different numbers of bits per symbol; and transmitting, by the gateway, the selected symbol on the feeder link from the gateway to the satellite.

In some implementations, the measure of signal strength is a measure of signal-to-noise ratio (SNR) or signal-to-interference-and-noise ratio (SINR).

In some implementations, the gateway is configured to transmit symbols on the feeder link in a transmodulation system in which transmissions on the feeder link are used by the satellite to transmit data on the first forward link and/or the second forward link, wherein the transmission on the feeder link is made using a modulation that is different from modulations concurrently used for the first forward link and the second forward link.

In some implementations, the first forward link is provided by a first beam of the satellite and the second forward link is provided by a second beam of the satellite.

In some implementations, the gateway comprises one or more processors configured to (i) determine a first number of bits per symbol used in a modulation for the first forward link and (ii) determine a second number of bits per symbol used in a modulation for the second forward link; and the modulator is configured to determine the subset of the symbols of the symbol constellation based in part on the determined first number of bits per signal and the determined second number of bits per symbol.

In some implementations, the gateway comprises one or more processors configured to (i) select a first modulation for transmission of the first bitstream on the first forward link based on a measure of signal strength for the first forward link and (ii) select a second modulation for transmission of the second bitstream on the second forward link based on a measure of signal strength for the second forward link; and the gateway is configured to specify, in a transmission on the feeder link, the selected first modulation for the first forward link and the selected second modulation for the second forward link.

In another general aspect, a communication system can be configured to perform functions including replacing or modifying start of frame field values in user link data to create feeder link data for transmission. The functions can be performed by satellite gateway, a data center (which may located remotely from the corresponding gateway(s)), or by another processing system.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 8 illustrates an example of frame structures for forward-link transmodulation using a fixed code length for each individual user stream.

FIG. 9 illustrates examples of tables for selecting user link modulations and codings based on user link SINR.

FIG. 13 is a flow chart showing an example of a process performed at a gateway for transmodulation using a universal constellation.

Like reference numbers and designations in the various drawings indicate like elements.

DETAILED DESCRIPTION

Figure 1:
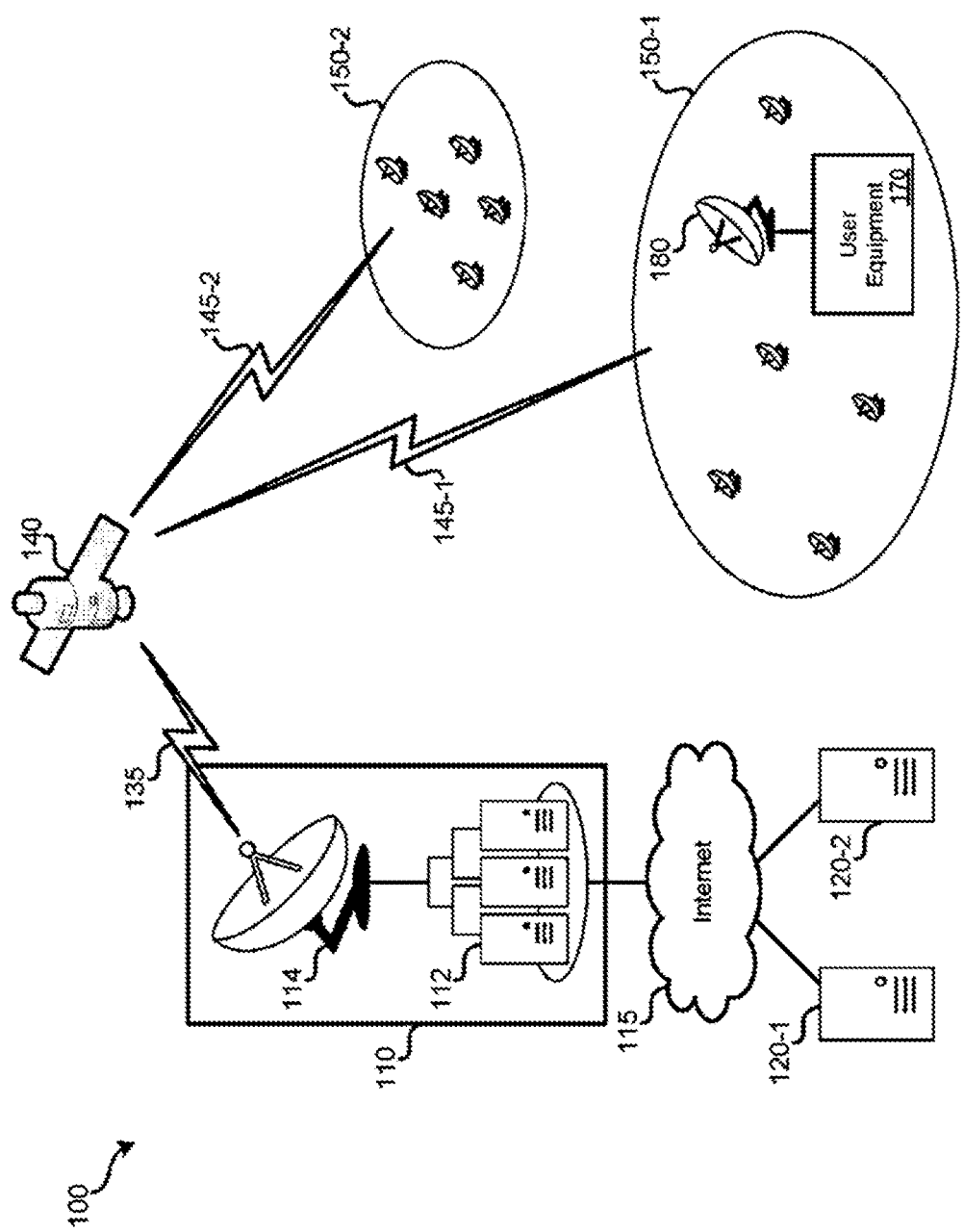
FIG. 1 is a block diagram showing an example of a forward-link satellite transmodulation system.

The present document describes a new approach of using a fixed universal constellation for feeder link transmissions from a terrestrial gateway to a satellite in a transmodulation satellite system. The same universal constellation can be used in different signal conditions (e.g., different SNR or SINR levels) to provide different levels of throughput (e.g., different numbers of bits per symbol). For example, different subsets of the symbols in the universal constellation can be used to maximize the throughput on the feeder link and allow reliable reception at different SINR levels.

In some systems, a satellite outroute varies the modulation and code rate (MODCODE) in a bent-pipe satellite system based on the SINR measured at a very small aperture terminal (VSAT) receiver, and the SINR will be reported to the gateway by the VSAT. The VSAT is configured to handle different modulations and code rates, which are selected based on the SINR measured at the VSAT, which will help to maximize the channel capacity in operation. The adjustment of coding and/or modulation over time based on signal conditions is often referred to as adaptive coding and modulation (ACM). These techniques are often used in transmission of media streams, such as Digital Video Broadcasting-Satellite-Second Generation (DVBS2) video streams.

In a transmodulation system, the gateway will combine two user beam data streams at feeder link to form transmissions based on one higher-order modulation constellation at the transmitter of the gateway. For example, the gateway can combine two user data streams of a DVBS2 outroute. On the satellite, a simple demodulator followed by a hard decision will separate the two user beam bit steams and remodulate them into separate DVBS2 waveforms, and then send each of the remodulated DVBS2 waveforms through RF modules of the satellite to the corresponding user beam. As a result, a single feeder link transmission can simultaneously provide the data for user link transmission in multiple beams.

The transmodulation system can operate to provide ACM also. Because both the feeder link and user link SINR will affect the throughput of the forward link, the modulations are selected based on both feeder link SINR and user link SINR for optimal system performance. For example, ACM can be implemented using a two-dimensional table which depends on both feeder link SINR and user link SINR. In real-world operation, the feeder link SINR will vary due to weather, pointing, and possible variable interference sources, and therefore the total number of bits per symbol that can be supported at feeder link will change over time. Also, for a specific feeder link SINR, two user beams may support different modulations or different bits per symbol due to a variety of factors, such as different directivity of user beams, VSAT locations in the beam, different antenna size at VSAT, weather variation, and interference.

Because SINR and throughput can vary rapidly on both the feeder link and user link, implementing ACM in a transmodulation system could potentially result in very frequent changes in the feeder link constellation used.

Accounting for both feeder link and user link SINR variations, the number of bits per user stream and total number of bits of the feeder link stream will have many different combinations. Nevertheless, it is not ideal to frequently vary the modulation of the feeder link, which increases the complexity of processing at both the gateway and the satellite.

As discussed further below, the use of a universal constellation for the feeder link can greatly simplify the processing required in a transmodulation system, while still providing the benefit of ACM to vary throughput to ensure reliable operation as feeder link SINR varies. When the feeder link SINR changes, rather than switching which constellation the feeder link uses (e.g., from 128-QAM to 64-QAM), the system can switch from among different subsets of the symbols in the universal constellation (e.g., from a first subset having 128 symbols of a 256-symbol universal constellation to a second subset having 64 symbols of the 256-symbol universal constellation). In this manner, the system can change the effective throughput and noise and interference tolerance of the feeder link, without requiring the satellite to change which constellation is demodulated. Other features and advantages will be discussed below.

FIG. 1 is a block diagram that illustrates an example of a forward-link satellite transmodulation system 100. The system 100 includes a gateway system ("gateway") 110, one or more networks (such as the Internet 115), computer systems 120, a satellite 140, and VSATs or other user equipment (UE), such as UE 170 and associated UE antenna 180. The gateway system 110 may serve as a gateway between one or more networks, such as the Internet 115 and one or more satellites, such as the satellite 140. The UE may communicate with gateway system 110 via satellite 140 to access the Internet 115. Through the Internet 115, various computer servers may be accessed, such as computer server 120-1 and computer server 120-2. When data is to be transmitted from a remote computer server, data may be transmitted to the gateway system 110. The gateway system 110 can include multiple components including a forward feeder link creator 112 and a transmit antenna 114.

In general, the system 110 can be configured for transmodulation, so that the forward feeder link from the gateway to the satellite can use a different modulation than the modulation used for forward user links from the satellite to the UEs. Typically, the feeder link has a higher-order modulation (e.g., a higher number of bits per symbol) than the modulation used for the forward user links. By using different modulation for the forward feeder link compared to forward user links, a greater amount of data can be transmitted on the forward feeder link per unit bandwidth. In many cases, a single feeder link can simultaneously supply the data for multiple satellite beams to user devices. The satellite can perform a transmodulation process to convert the received higher-order forward feeder link into multiple lower-order modulated forward user links. Therefore, a single feeder link can be used to transmit the data to a satellite for transmodulation and retransmission by the satellite to UEs as two or more forward user links.

The system 110 is configured to perform transmodulation, as opposed to transcoding. Notably, there is a difference between transmodulation and transcoding, which can involve a complexity/performance trade-off. Transcoding involves demodulating, decoding, recoding, and remodulating received data into multiple downlinks, which can result in considerable complexity, processing requirement, and power usage on the satellite. In contrast, for transmodulation, only demodulation and remodulation is performed at the satellite, which involves much lower complexity and power use. In many cases transmodulation can be performed with potentially only a minor performance penalty over the range of feeder link SNR of interest. In cases where SINR is discussed or measured, SNR can be equivalently used, as both measures can be used effectively in many circumstances.

By using a different, higher-order modulation for the forward feeder link compared to the forward user links, the SINR of the forward user links do not constrain which modulation can be used for the forward feeder link. By achieving a higher data rate in the forward feeder link (due at least in part to the higher-order modulation on the forward feeder link), the number of gateways needed to transmit forward feeder links can be reduced. Additionally or alternatively, the total forward capacity of the forward link can be increased while maintaining the same number of gateways.

In the system 100, a forward link involves transmission of data via the satellite 140 from the gateway system 110 to a UE. (A reverse link transmits data via the satellite 140 from a UE to the gateway system 110.) In FIG. 1, the forward link includes forward feeder link 135, which represents a signal being transmitted from a gateway transmit antenna 114 to the satellite 140. The forward link further includes forward user links 145 (e.g., 145-1, 145-2).

The SINR for forward feeder link 135 may be significantly higher than the SINR for individual forward user links of forward user links 145. The power level used for transmitting RF signals by satellite 140 is part constrained by factors such as the amount of power that the satellite 140 can generate on-board using solar panels. In contrast, the transmit power used to transmit via the antenna 114 is effectively not power constrained and the antenna 114 may have a significantly higher gain than the satellite's transmit antenna. Therefore, the SINR of forward feeder link 135 can be expected to almost always be significantly greater than the SINR of any forward user link of forward user links 145.

A higher order modulation is used by forward feeder link creator 112 for modulating the forward feeder link than is used for modulation of forward user links 145. By a higher modulation being used for the forward feeder link 135, the bandwidth available for transmitting data from the gateway system 110 to the satellite 140 is increased. For example, 256-QAM may be used for the higher-order modulation on forward feeder link 135 and 16-QAM may be used for one or both of the forward user links 145. Therefore, a single forward feeder link, such as the forward feeder link 135, can be used to transmit all data needed for the satellite 140 to transmodulate and transmit two or more lower-order modulation forward user links. In the example of FIG. 1, the forward feeder link 135 is transmodulated and retransmitted as two forward user links; however, in other embodiments, a greater number of forward user links may be created from a single forward feeder link. The data rate of the feeder link can be equal to or greater than the sum of the data rate of each forward user link created from the feeder link.

The multiple forward user links may reuse the same frequency spectrum. For instance, the forward user links 145 may service different geographical regions, such as illustrated in FIG. 1. In FIG. 1, UEs within a geographic region 150-2 receive data via forward user link 145-2 and UEs within a geographic region 150-1 receive data via the forward user link 145-1. Alternatively, the forward user links 145 may service the same or overlapping geographical regions using different frequency spectrum. An example of UE is shown as UE 170, which uses a dish antenna 180 (or a phased-array antenna or some other type of antenna) to receive data on the forward user link 145-1 from the satellite 140. Each forward user link may service one or more UEs. The UEs may function as an access point (AP) to allow one or more other devices (e.g., wired or wireless computing devices) to access networks, such as the Internet 115. The system 100 can provide UEs (and computing devices in communication with UE) with broadband Internet services. For instance, media or data may be streamed or transmitted to UEs by the computer systems 120 via the system 100.

Figure 2:
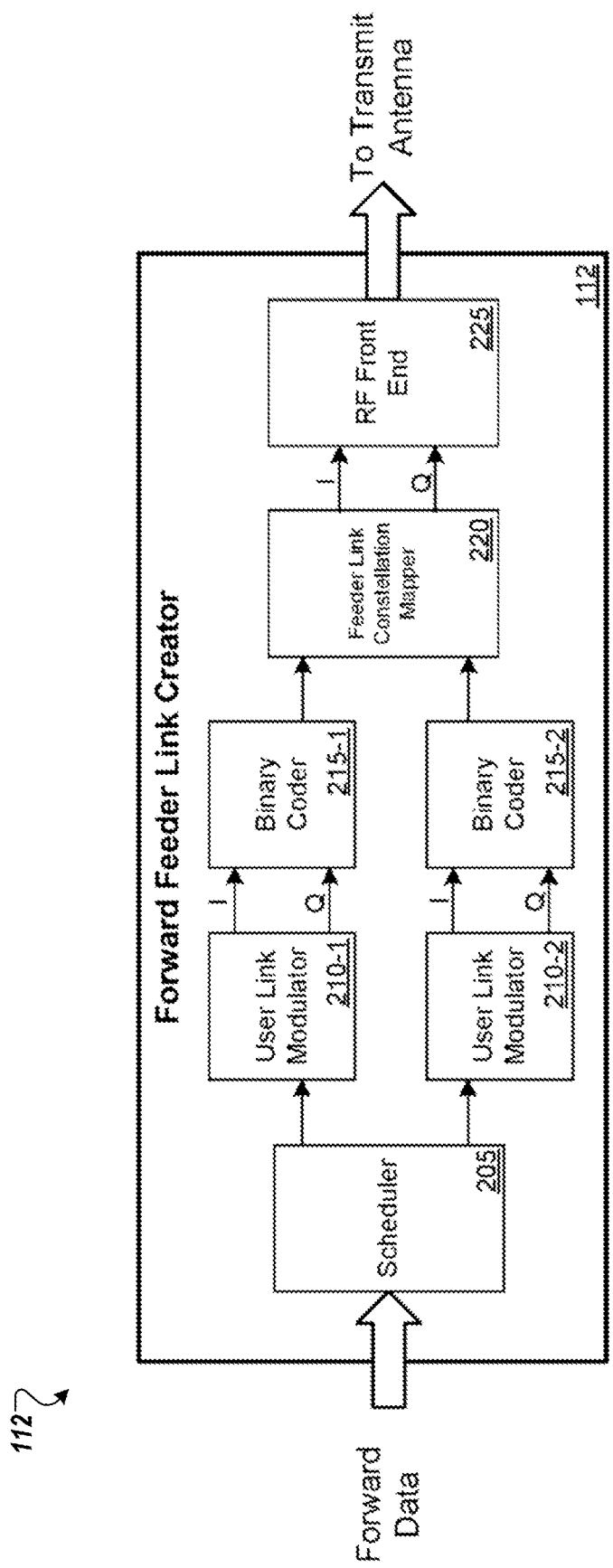
FIG. 2 is a block diagram of an example of a forward feeder link creator of a gateway.

FIG. 2 illustrates a block diagram of an embodiment of a forward feeder link creator 112 of the gateway system 110. The forward feeder link creator 112 can include a scheduler 205, user link modulators 210, binary coders 215, a feeder link constellation mapper 220, and an RF front-end 225.

The forward feeder link creator 112 may include both analog RF circuitry and computerized components. Computerized components may be used to perform the functions of components such as the scheduler 205, the user link modulators 210, the binary coders 215, and the feeder link constellation mapper 220. Components such as digital-to-analog converters (DACs), amplifiers, and analog components may be used to the implement RF front-end 225. The computerized components may be implemented using specialized software executed on general purpose processing system, which can include one or more processors. Alternatively, specialized hardware (e.g., application-specific integrated circuits (ASICs)) may be created to perform such functions or may use firmware to configure general-purpose hardware as specialized hardware (e.g., field-programmable gate arrays (FPGAs), structured ASICs or eASICs).

The scheduler 205 may receive data from one or more networks, such as the Internet. The data may be addressed to various UEs that receive one or more forward user links from the satellite. The scheduler 205 may buffer data and schedule when the received data should be transmitted by the gateway to the addressed UE via satellite. For example, the scheduler 205 may ensure that each UE is allocated only up to a certain amount of bandwidth, such as in accordance with a services agreement. The scheduler 205 may prioritize data based on its type, such as to ensure a quality of service (QoS) level. The scheduler 205 may assign data to be transmitted to UE to a user link that will be received by the UE. This can include determining the correct user link that the UE is receiving and/or the correct user link that services the geographic region of the UE. In the illustrated example of FIG. 2, the scheduler 205 creates separate data streams for two forward user links. In this example, the higher-order modulation used for the feeder link has sufficient data rate to service two forward user links that use lower-order modulation. In other cases, the higher-order modulation feeder link can have sufficient data rate to service three or more lower-order modulation forward user links; in such cases the scheduler 205 would output a separate data stream for each forward user link.

The output of the scheduler 205 can optionally be processed by user link modulators 210 and binary coders before providing a bitstream to the feeder link constellation mapper 220 which performs modulation for the feeder link. User data streams are not transmitted with separate modulation on the feeder link, but as discussed below, using user link modulators 210 and binary coders 215 can enhance compatibility with and reduce the amount of reconfiguration needed to update "bent-pipe" satellite gateways to perform transmodulation. In some implementations, in place of the user link modulators 210 and binary coders 215, the forward feeder link creator can use a digital processing module that processes the forward data in the digital domain, without modulation, to create the bitstreams for the feeder link constellation mapper 220.

The illustrated example shows user link modulators 210 that each receive a data stream to be transmitted as a particular forward user link. Each user link modulator 210 performs modulation on its corresponding data stream. The user link modulators 210 may operate according to the DVBS2 (digital video broadcasting, second generation) standard, which can be used for purposes such as standard definition broadcasts, high definition broadcasts, and/or broadband internet services. The user link modulators 210 may perform tasks in addition to modulation, such as pilot insertion and scrambling of the payload. Therefore, it may be beneficial to retain the user link modulators 210 even though modulation for the feeder link will be performed by feeder link constellation mapper 220. For the particular data stream received by each user link modulator 210, the modulation eventually used by the satellite 140 in the user link may be based on the SINR between the satellite and the particular UE the data is addressed to. Therefore, within a particular forward user link, multiple different lower order modulations may be used serially. For example, a first UE that has a high SINR for the forward link may use a relatively higher-order modulation compared to another UE that has a lower SINR for the forward link.

Each of user link modulators 210 may output signals for an I (in-phase) and a Q (quadrature) channel. The output of the user link modulators 210 may be a forward user link signal that has been modulated, possibly along with other data added, such as for packet headers and calibration. For example, for ASK-based or QAM-based modulation, the I and Q channels may be out of phase by 90° (a condition referred to as quadrature). The user link modulators 210-1 and 210-2 may concurrently use the same or different modulations.

Binary coders 215 may convert each symbol of the I and Q channels output by user link modulators 210 into raw streams of binary data. Retained within this binary stream of data may be processing that user link modulators 210 performed, such as pilot insertion and scrambling of the payload. Each complex symbol from the I and Q channels may be used to generate some number of bits based on the modulation used. Binary coders 215 have access to multiple stored symbol mappings (also referred to as symbol constellations) for multiple different modulations. For example, different symbol constellation mappings are used for pi/2 BPSK, QPSK, 8PSK, 16 APSK, 8-QAM, etc. If DVBS2 is used, two different modulations may be used within codewords, including pi/2 BPSK modulation for the PLHeader and a separate payload modulation.

In some scenarios, the constellation mapping used for the header (pi/2 BPSK) overlaps with the constellation used for the payload. Therefore, if the payload constellation is used for binary conversion of the header, the correct value can be obtained and output for the header. However, for some modulations, the header modulation constellation does not accurately overlap with the payload constellation. For example, if pi/2 BPSK is used for the header and 16-APSK is used for the payload, using 16 APSK to interpret the header results in incorrect binary values. In such embodiments, amplitude scaling may be used for the pi/2 BPSK symbols to overcome the conflict.

Based upon the symbol of the I and Q channels, binary coder 215 outputs a corresponding sequence of bits. Therefore, the output of binary coder 215-1 is a binary stream of data for the first forward user link; the output of binary coder 215-2 is a second binary stream of data for the second forward user link. Each of these binary streams can be fed to the feeder link constellation mapper 220. The binary streams may be concatenated together such that the first half and second half of a string of concatenated bits can be mapped to the in-phase and quadrature components of the feeder link constellation. For example, in the example of a 256-QAM constellation, the first four bits of the symbol can correspond to the binary stream received from binary coder 215-1 and the last four bits of the symbol can correspond to the binary stream received from binary coder 215-2. Therefore, each created symbol contains binary data from the first binary stream and binary data from the second binary stream. Additionally or alternatively, bit order manipulation can be applied to the bits of each feeder link symbol to improve performance. The bit order manipulation may be different per user link MODCODE (e.g., modulation and code rate) for a specific feeder link constellation.

The feeder link constellation mapper 220 may modulate the first and second binary streams together using a universal constellation. The feeder link constellation mapper 220 can be configured to provide data of one user data stream (e.g., for a first forward user link) on the I channel and to provide the data of the other user data stream (e.g., for a second user link) on the Q channel.

The forward feeder link creator 220 (and the gateway system 110 overall) may be configured to consistently use a single, predetermined constellation for the feeder link, even though the SINR for the feeder link may vary (which may change the maximum throughput achievable on the feeder link) and the SINR for the user links may vary (which may change the demanded throughput for the feeder link). Rather than switching among different feeder link modulations (e.g., 64-QAM, 128-QAM, 256-QAM) based on the SINR of the forward feeder link, the feeder link constellation mapper 220 can instead use different subsets of the symbols in the universal constellation to account for changes in feeder link SINR. For example, the subset that is selected can have symbols spaced apart, e.g., by skipping symbols in the horizontal and/or vertical axes of the constellation to provide space between symbols and reduce the risk of reception errors at the satellite. For example, the system can skip or avoid using certain columns and/or rows in the constellation to make the symbols easier to distinguish.

As an example, the gateway system 110 can be configured to use a universal constellation of 256-QAM for the feeder link. This allows for a maximum of 8 bps, but the same constellation can also be used to transmit fewer bits of user bitstreams per symbol when the signal conditions do not permit the full 8 bps. For example, if the feeder link SINR meets a threshold to support 8 bps transmission, then the full universal constellation can be used. In other words, the feeder link transmission provides 8 bits from user bitstreams for each symbol. If the feeder link SINR does not meet that threshold and only supports 7 bps transmission, then the feeder link constellation mapper 220 will assign 7 bits from the user bitstreams per symbol, and will select symbols from among a subset having only 128 of the 256 symbols in the universal constellation. This results in a modulation that is effectively 128-QAM, but is aligned to the 256-QAM universal constellation. The gateway system 110 will send actual 256-QAM symbols from the universal constellation (not symbols from a separate 128-QAM constellation), but limiting the selection to a subset of the symbols in the constellation helps maintain separation and limits errors in demodulation by the satellite 140.

As discussed further below, the feeder link constellation mapper 220 can alternate or vary which subsets of the universal constellation are used. This can involve switching among distinct subsets of the universal constellation. For example, when providing 7 bps using the universal constellation (e.g., approximating 128-QAM), the feeder link constellation mapper 220 can switch between (i) selecting a symbol from a first group of 128 symbols from the universal constellation and (ii) selecting a symbol from a second group of 128 symbols from the universal constellation, where the symbols in the second group are those excluded from the first group. The feeder link constellation mapper 220 can alternate between the two groups symbol by symbol, so that each symbol is selected from a different group than the previous symbol.

The universal constellation may use a Gray code constellation mapping, which can help decrease errors due to interference or noise. The output of the feeder link constellation mapper 220 may be I and Q channels that have been modulated using the universal modulation. In some implementations, each of the I and Q channels carries a separate data stream for a different UE (e.g., the I channel carries up to 4 bits per symbol for a first forward user link, and the Q channel carries up to 4 bits per symbol for a different forward user link). The effective data rate of the modulated feeder link output may be equal to or greater than the sum of the data rates for the user links. In addition to mapping the binary data to complex I/Q symbols for transmission, the feeder link constellation mapper 220 may manage the creation of feeder link frames, as detailed in relation to FIGS. 4A and 4B and FIGS. 7 and 8.

An advantage to using the user link modulators 210 prior to modulation by the feeder link constellation mapper 220 may be to limit the amount of reconfiguration needed for gateway systems designed for "bent-pipe" transmission to be configured for transmodulation. For example, some gateway systems include modulators that function as user link modulators 210 (however, such systems do not have binary coders 215 and feeder link constellation mapper 220). Further, such components may already handle pilot insertion and payload scrambling or encryption. Nevertheless, the use of user link modulators 210 and binary coders is optional. In some implementations, data to be transmitted by the multiple forward user links may be received by the feeder link constellation mapper 220 directly from the scheduler 205 or another processing module that does not modulate user data before providing the data streams to the feeder link constellation mapper 220.

The I and Q channels output by feeder link constellation mapper 220 are provided to RF front-end 225. RF front-end 225 may perform digital-to-analog conversion, amplification, and/or otherwise convert the output of feeder link constellation mapper 220 into a signal appropriate to be transmitted by transmit antenna 114 of FIG. 1 to the satellite.

Figure 3:
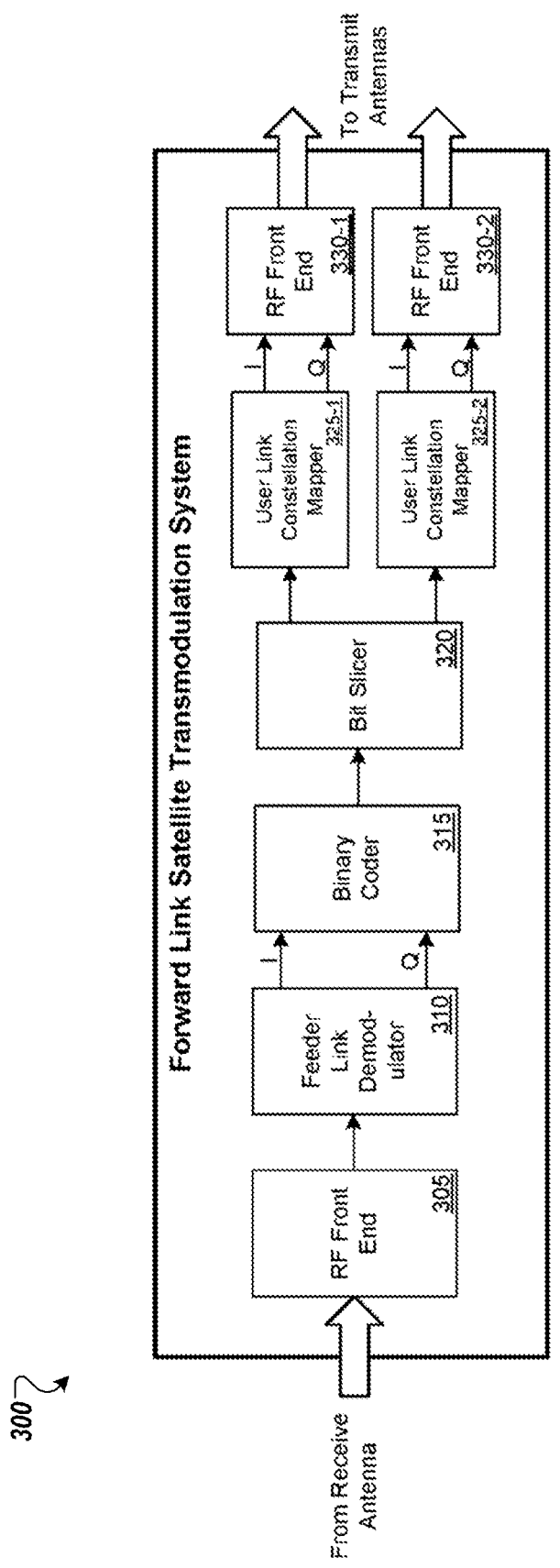
FIG. 3 is a block diagram of an example of a forward link satellite transmodulation system for use on a satellite.

FIG. 3 illustrates a block diagram of an example of a forward-link satellite transmodulation system 300. At a high level, the system 300 receives signals of the feeder link, performs transmodulation, and outputs signals on multiple lower-order modulation forward user links. The system 300 can be reside on, and be incorporated in, the satellite 140. The system 300 can include a RF front-end 305, a feeder link demodulator 310, a binary coder 315, a bit slicer 320, user link constellation mappers 325, and RF front-ends 330. The system 300 may include both analog RF circuitry and computerized components. The components can be radiation hardened for use in space. Computerized components may be used to perform the functions of components such as the feeder link demodulator 310, the binary coder 315, the bit slicer 320 and the user link constellation mappers 325. ADCs, DACs, amplifiers, and analog components may be used to implement RF front-ends 305 and 330. The computerized components may be implemented using specialized software executed on a general purpose processing system that can include one or more processors. Alternatively, specialized hardware (e.g., ASICs) may be created to perform such functions or may use firmware to configure general-purpose hardware as specialized hardware (e.g., FPGAs, eASICs).

The RF front-end 305 may receive the forward feeder link signal from the gateway via a receive antenna on the satellite. The RF front-end 305 may perform analog to digital conversion, amplification, and otherwise convert the received analog signal into a signal appropriate to be processed by the feeder link demodulator 310.

The feeder link demodulator 310 may receive the signal from the RF front-end 305 and demodulate the received modulated feeder link signal into I and Q components. The I and Q components may be output to binary coder 350. Using the universal constellation (e.g., a predetermined constellation such as for 256-QAM), the binary coder 315 converts the complex symbol of the received I and Q components from feeder link demodulator 310 into a raw binary stream. Because the universal constellation is fixed and consistently used over time, even over a wide range of feeder link SINR levels, demodulation at the satellite 140 is simple and efficient. For example, when the universal constellation is 256-QAM constellation, the satellite can remain in a 256-QAM mode for demodulating the feeder link because symbols transmitted will be from that constellation, even when the feeder link SINR would traditionally support only a lower-order modulation (e.g., 128-QAM, 64-QAM, etc.). As a result, the satellite 140 does not need to detect which modulation is used for the feeder link or switch to demodulate different sets of symbols, yet the system still enables a variable level of throughput and an variable number of bits per symbol set according to the feeder link SINR.

The number of bits demodulated from each symbol varies based on the manner in which the gateway system 110 used the universal constellation. For example, although the same 256-QAM universal constellation may be used in various situations, each symbol may carry 8, 7, 6, 5, or another number of user bits depending on the manner in which the gateway system 110 modulated the signal for the feeder link. Thus, rather than changing which feeder link constellation is used, the system varies the number of bits to be interpreted from the received symbols while allowing the satellite to remain in single mode of demodulation. In effect, the technique transfers the complexity of processing of from the satellite, which would previously need to change the feeder link demodulation scheme, to the gateway system 110 where the varying channel conditions can be addressed through the selection of symbols within the universal constellation. Transferring this processing to the gateway system 110 reduces complexity and lowers power use on the satellite 140. Different feeder link SOF (FSOF) patterns will map to different effective or actual bits being transmitted. In an example system that combines two user links, a total of 8 FSOF sequences (e.g., 4 sequences for the I channel and 4 sequences for the Q channel) will cover 4 modulation types for each user link. As discussed further below, the original forward link SOF values can be replaced by a transmitter signal processing module for feeder link forward link transmission at ground section, and the modification of the SOF field values (e.g., replacement with FSOF values or other values) can be performed at the gateway system 110 or at a data center depending on implementation choices.

The bit slicer 320, which can be referred to as a demultiplexer, can function to demultiplex the raw binary stream received from the binary coder 315. The bit slicer 320 may serve to forward bits corresponding to the first forward user link to user link constellation mapper 325-1 and forward bits corresponding to the second forward user link to user link constellation mapper 325-2. Because the symbols encoded by the feeder link constellation mapper 220 are split between the first forward user link and the second forward user link in a predefined pattern, the bit slicer 320 can use this known pattern to demultiplex the binary data. For example, if each symbol represents eight bits, and each symbol represents four bits for a first user link and four bits for a second user link, then the first four bits of each symbol are forwarded to user link constellation mapper 325-1 and the last four bits of each symbol are forwarded to user link constellation mapper 325-2.

Based on the feeder link SINR and the different SINR levels for the forward user links, the amount of data provided per symbol may vary and may be split differently among the user links. For example, if the feeder link supports 7 bps, the gateway system 110 may use the seven bits of each symbol in different combinations, such as: 4 bits for a first user link and 3 bits for a second user link; 3 bits for the first user link and 4 bits for the second user link; 5 bits for a first user link and 2 bits for a second user link; 2 bits for the first user link and 5 bits for the second user link; and so on. A 7 bps transmission may represent other splits among more than two user links, such as a split of 3 bits, 2 bits, and 2 bits to provide data for three different user links.

In some implementations, the bits for different user links are separated on the I and Q channels, with the I channel data provided for one user link and the Q channel data provided for another user link. This particular split is not required, however, and the gateway system 110 can modulate the data so that data for one or more of the user links is indicated using both the I and Q channels. For example, when the gateway system 110 provides 7 bps with a 256-QAM universal constellation, the seven bits may include five bits for one user link, which would include at least one bit indicated by each of the I and Q channels. In this example, the I and Q channels each provide no more than 4 bits per symbol, so at least a portion of both I and Q channels would be used for the data of a single user link.

The user link constellation mappers 325 modulate signals for different user links (e.g., for different satellite beams). The user link constellation mappers 325 can be modulators that use lower-order modulation than the universal constellation used by the feeder link constellation mapper 220. The sum of the data rate of the forward user links created by user link constellation mappers 325 may equal or be less than the data rate modulated into the output by the feeder link constellation mapper 220. Each user link constellation mapper of the user link constellation mappers 325 corresponds to a different forward user link. The modulation used by user link constellation mappers 325 varies based on the SINR of the UE to which particular data is addressed.

In some implementations, the different forward user links correspond to different satellite beams (e.g., spot beams), which may be directed to different, and typically substantially non-overlapping, geographical areas. The transmissions can also be performed using time division multiple access (TDMA), so that transmissions for different UEs in an area are made in different time slots. Even within the same geographical area of a satellite beam, different UEs may have different SINR levels for their user link. As a result, as the TDMA scheme moves through time slots allocated to different UEs, different modulations and data rates may be used for different UEs. The gateway system 110 can receive data from the UEs that indicates the respective SINR levels of the UEs, and the gateway system 110 can select an appropriate modulations for each UE based on its SINR. The transmissions of the gateway system 110 to the satellite 140 can indicate the modulation that the satellite 140 should use for transmissions to different UEs, and the satellite 140 can re-modulate data for each user link accordingly (e.g., to modulate data for the assigned time slots for a UE with the modulation specified for the UE).

Therefore, the lower-order modulations used by user link constellation mappers 325 can vary (with respect to each other and individually over time), but remain at a combined data rate that is no more than the total data rate of the feeder link. The output of user link constellation mappers 325 may be I and Q signals to separate RF front-ends.

The RF front-ends 330 may perform digital-to-analog conversion, amplification, and otherwise convert the output of user link constellation mappers 325 into signals appropriate to be transmitted by transmit antennas of the satellite. The output analog signals from the RF front-ends 330 may be transmitted at a same frequency to different geographic regions or may be output at different frequencies to the same or overlapping geographic regions.

Figure 4A:
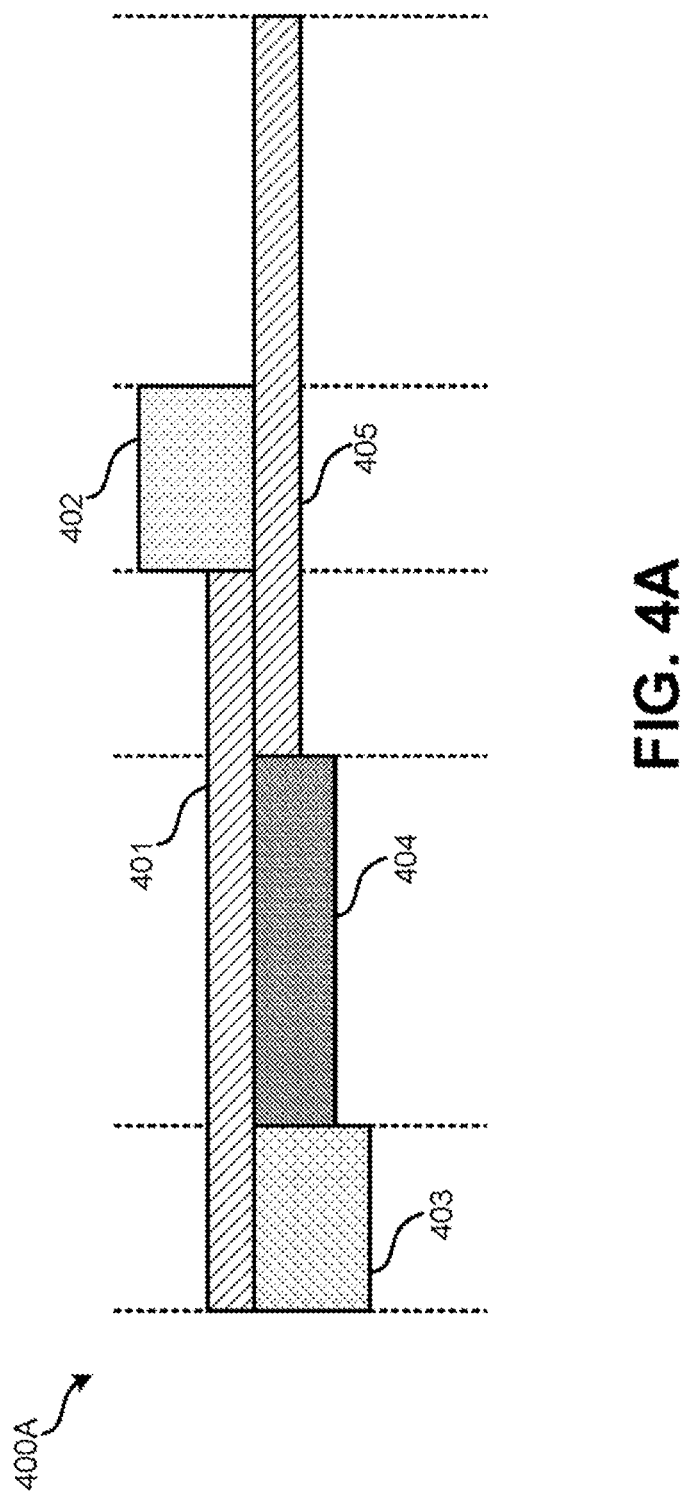
FIGS. 4A and 4B illustrate examples of different forms of frame structures that may be used as part of a forward-link satellite transmodulation system.
Figure 4B:
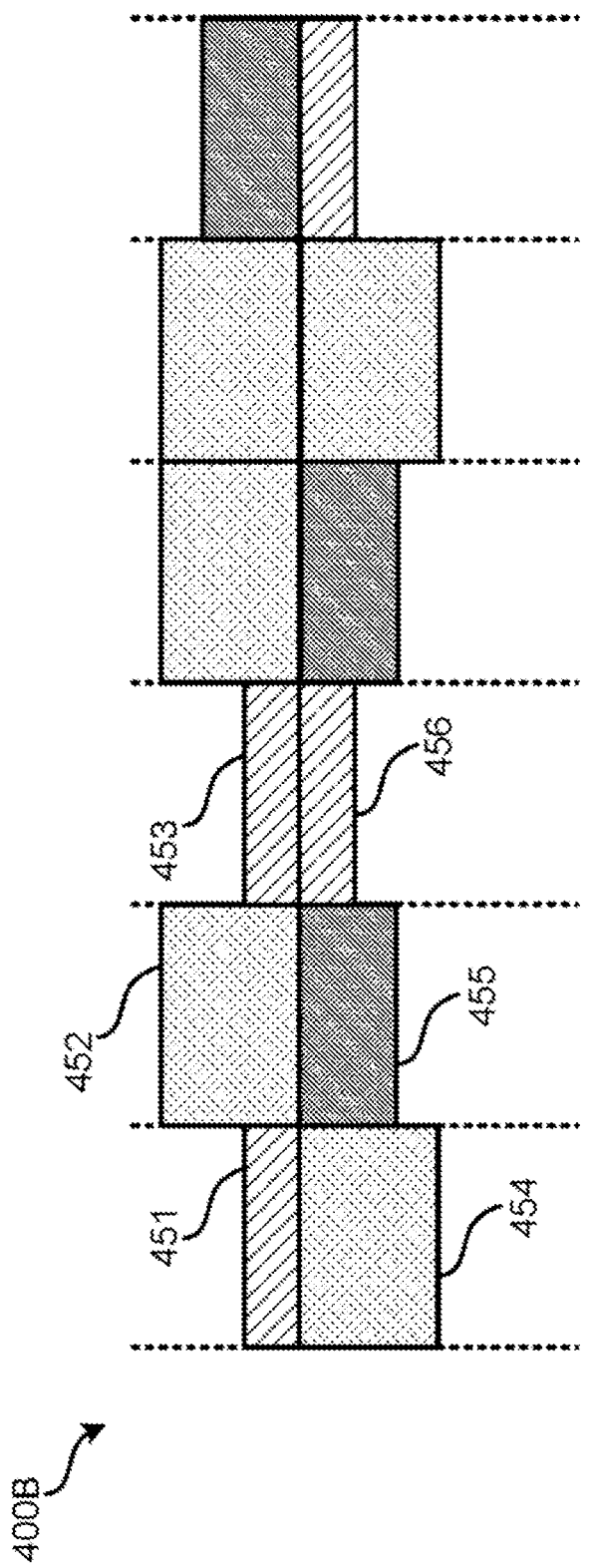

FIGS. 4A and 4B illustrate examples of different forms of frame structures that may be used as part of a forward-link satellite transmodulation system. In the forward feeder link creator 112 of FIG. 2, different approaches can be taken when creating forward feed link frames by the feeder link constellation mapper 220. In some implementations, fixed codeword lengths may be used. FIG. 4A illustrates an example 400A of a frame structure of a forward feeder link in which each embedded forward user link has a fixed codeword length.

In FIG. 4A, the number of bits per symbol (e.g., bit width) of each modulated codeword is represented by the relative "thickness" of the codeword in the figure. Codewords 401 and 405 are modulated using a lower-order modulation than codeword 404, and codeword 404 is modulated using a lower-order modulation than codewords 402 and 403. Because the codeword lengths are fixed, it takes longer to transmit the same length codeword using the modulation of codewords 401 and 405 than the modulations of codewords 402, 403, or 404. Since the codewords are fixed in length but have different modulations, if different modulations are used by the forward user streams modulated as part of a single forward feeder link, the frame boundaries will not always align. At the satellite 140, further processing will be needed to manage synchronization since the frame boundaries will not always be aligned.

In FIG. 4B, similar to FIG. 4A, the bit width per symbol of each modulated codeword is represented by the thickness of the codeword. However, in FIG. 4B, a fixed frame length is used for feed link frames. Therefore, the codeword length of the forward user links varies. Each frame, regardless of modulation, has a same fixed frame length. Codewords 451, 453, and 456 are modulated using a lower-order modulation than codeword 455. Codeword 455 is modulated using a lower-order modulation than codewords 452 and 454.

Because the frame length is fixed, each frame will begin and end at a same time with the modulated forward feeder link signal. A different feeder link SOF (FSOF) can be inserted to indicate different ways of bit concatenation at the gateway. This information can be used on satellite to slice the bit stream and demultiplex into two or more bit streams. Since the frame boundary is known, consistent, and relatively easier to detect, synchronization information can be inserted at the satellite when transmodulation into the forward user links is performed. This arrangement further allows the boundary of each forward user link frame to match with the boundary of each feeder link frame.

Figure 5:
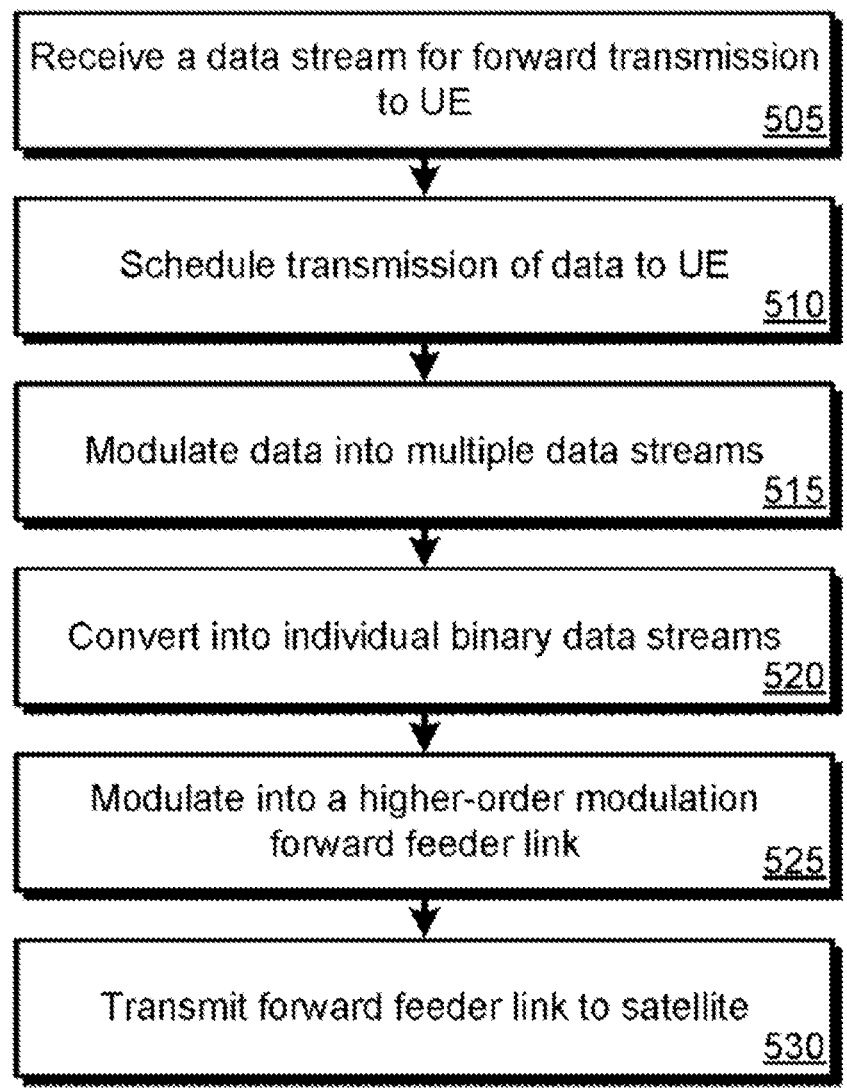
FIG. 5 illustrates an example of a method for performing forward-link transmodulation at a gateway for transmission to a satellite.

Various methods may be performed using the systems, devices, and arrangements of FIGS. 1-4B. FIG. 5 illustrates an example of a method 500 for performing forward-link transmodulation at a gateway for transmission to a satellite. The method 500 may be performed using system 100 of FIG. 1 and forward feeder link creator 112 of FIG. 2. In some implementations, each block of method 500 may be performed by forward feeder link creator 112.

At block 505, data packets may be received by the gateway that are addressed to various UE services by the gateway. For instance, the data packets can include media or broadband internet-related data packets addressed to UE.

At block 510, transmission of the data packets may be scheduled. This can include some data packets being prioritized over other data packets or the amount of bandwidth allocated to transmission of data packets addressed to a particular UE being throttled. Further, the data packets may be assigned to forward user links that will be received by the UE to which the data packets are addressed. For example, a first data packet may be assigned to a first forward user link and a second data packet may be assigned to a second forward user link.

Blocks 515 and 520 provide optional steps that can be used to prepare user bitstreams for transmission, before they are combined in the feeder link. These techniques can make use of common processing flows in existing gateways that may not have been originally intended for transmodulation use. Blocks 515 and 520 can make it easier to retrofit or upgrade a gateway initially intended for bent pipe operation to a transmodulation mode. In addition, retaining the user link modulators can assist to provide a gateway that retains capability for bent pipe and transmodulation operation modes.

At block 515, the data assigned to each forward user link may be modulated using a lower order modulation that is selected based on the SINR for transmission from the satellite to the addressed UE. At block 515, a DVBS2 SOF can be used and the rest of the bits may be mapped into the appropriate user link constellation for the user link MOD-CODE based on an input SOF pattern or other data. The lower order modulations used for the different user links may be the same or different. The types of modulation can include BPSK, 16-APSK, 8-PSK, 16-QAM, etc. In addition to performing the lower-order modulation, it is possible that additional processing may be performed such as scrambling of the data payloads and pilot insertion. Block 515 may include the output of separate I and Q signals for each forward user link.

At block 520, each I and Q signal may be converted into a raw binary stream. A binary converter may be used for each pair of I and Q signals to perform hard decision decoding. The binary converter may have access to one or more modulation constellations that correspond to the types of modulation available for use at block 515. The number of bits decoded from the I and Q signals varies based on the type of lower-order modulation used. Each binary converter outputs a raw stream of binary data that corresponds to a particular forward user link.

In some implementations, instead of modulating multiple data streams and converting to binary data streams, blocks 515 and 520 are replaced with digital processing that does not separately modulate the data streams for user links. For example, data scrambling, pilot insertion, insertion of headers, and other processing can be done in the digital domain.

At block 525, the raw binary streams for the user links may be combined and modulated using a universal constellation for transmission on the feeder link. Although a fixed constellation is consistently used even as feeder link SINR changes, the gateway system can vary the number of bits per symbol through the selection of the symbols being transmitted. For example, when selecting a symbol to send, the gateway system may restrict the selection to a proper subset (e.g., fewer than all) of the symbols in the constellation, to effectively transmit with fewer than the maximum number of bits per symbol that the constellation can support. This enables the gateway to consistently use a single constellation of a higher-order modulation, but to use subsets of the constellation to approximate lower-order modulations and vary the number of bits per symbol to account for lowered feeder link SINR. This results in several different selectable modes of using the universal constellation (e.g., a first mode where each transmitted symbol is selected from among all 256 of the 256-QAM symbols, to provide 8 bps; a second mode in which each transmitted symbol is selected from among a subset of 128 of the 256-QAM symbols, to provide 7 bps; a third mode in which each transmitted symbol is selected from among a subset of 64 of the 256-QAM symbols, to provide 6 bps; etc.).

As an example, if the universal constellation is 256-QAM, and the feeder link SINR supports no more than 7 bps, then the gateway system selects the symbol to transmit from among a subset having only 128 of the 256-QAM symbols, effectively using the 256-QAM symbols to approximate or simulate 128-QAM but aligned to the positions the symbols occur in the 256-QAM universal constellation. There can be two distinct subsets having 128 symbols, and the gateway system alternates between using the different subsets. For example, the gateway system can alternate which subset is used for each symbol in a sequence. For example, the first symbol in a sequence can be selected from the first subset of 128 symbols, the second symbol in the sequence can be selected from the second subset of 128 symbols, the third symbol in the sequence can be selected from the first subset of 128 symbols, and so on.

As another example, if the universal constellation is 256-QAM, and the feeder link SINR supports no more than 6 bps, then the gateway system selects the symbol to transmit from among a subset having only 64 of the 256-QAM symbols. In effect, this can use subsets of the 256-QAM symbols to approximate or simulate 64-QAM but with the symbols aligned to the positions the symbols occur in the 256-QAM universal constellation. There can be four distinct subsets of the 256-QAM symbols, and the gateway system alternates or rotates among the four subsets. For example, the gateway system can cycle through the four subsets so that each symbol selected for transmission is selected from a different subset than the one used to select the previous symbol. For example, the first symbol in a sequence can be selected from the first subset of 64 symbols, the second symbol in the sequence can be selected from the second subset of 64 symbols, the third symbol in the sequence can be selected from a third subset of 64 symbols, the fourth symbol in the sequence can be selected from a fourth subset of 64 symbols, the fifth symbol in the sequence can be selected from the first subset of 64 symbols, and so on. The gateway system can select symbols for transmission in a repeating cycle in this manner.

As part of preparing the transmissions, the gateway system can create or assign headers to be transmitted in the feeder link. This can include removing or replacing the headers that would normally be included in transmissions on the feeder links (e.g., user link headers or standard DVB-S2 SOF field values). For example, the gateway system can insert custom headers in the feeder link data stream. These headers can include custom feeder link start of frame (FSOF) fields, which indicate the beginning of new data packets, data bursts, or data sequences. The custom FSOF field data can also indicate the recipient (e.g., terminal or UE) for the associated transmitted data and the modulation to use for the user link to the recipient. The FSOF field data, or data in other fields, can indicate the data split for the feeder link transmitted symbols, e.g., how many bits of each universal constellation symbol carry data, and which of the bits of each symbol should be provided to the respective recipients or user links.

The gateway system can use signal strength or signal quality information for the feeder link and for the user links to determine which number of bits per symbol to provide on the feeder link, and thus what size of subset of the universal constellation should be used for selecting symbols. For example, the gateway system can receive data from the satellite indicating the SINR for the feeder link, and then use the SINR to determine the maximum number of bits per symbol that is supported by the feeder link. For example, the gateway system can store a table, rules, a set of thresholds, or other data that indicates ranges of SINR for the feeder link and corresponding numbers of bits per symbol. As an example, a SINR of greater than 26 dB may support 8 bits per symbol, from 23 to 26 dB may support 7 bits per symbol, from 20 to 23 dB may support 6 bits per symbol, and so on. The gateway system can use this data to look up the maximum number of bits per symbol that is supported with current feeder link conditions.

The gateway system can also determine an appropriate modulation to be used for the various user links based on the SINR for the user links. For example, based on SINR reports from terminals, the gateway system may determine that a first user link (e.g., for transmitting data to a first terminal in a first satellite beam) supports 4 bps while a second user link (e.g., for transmitting data to a second terminal in a second satellite beam) supports only 3 bps, for a total of 7 bps. The gateway system then uses the data rates determined for the user links and for the feeder link to set the parameters for the feeder link. If the feeder link can support at least the desired 7 bps to feed the two downlinks, then the gateway determines that the 7 bps mode of using the universal constellation should be used. However, in some cases, the feeder link may not support the combined data rate of the maximum that the user links can support. In these cases, the gateway system can allocate a lower data rate to one or more of the user links, so the total data rate is the level that the feeder link can support. For example, if the feeder link can support only 6 bps, then the gateway system can allocate 3 bps for the first user link and 3 bps for the second user link.

To appropriately and efficiently determine the modulations for the user links and the mode for using the universal constellation in the feeder link, the gateway system can store tables, defined in advance, that specify MODCODES for terminals based on the feeder link SINR and the terminal's SINR. The gateway system can assign different MODCODES to be used for different combinations of feeder link SINR and terminal SINR. For example, as will be discussed further with respect to FIG. 9, different tables can be stored for different levels or ranges of feeder link SINR. In each table, the entries can indicate different MODCODES for different levels or ranges of user link SINR. Thus, the gateway system can use the feeder link SINR to select a table, and use the user link SINRs to select MODECODES for the user links from within the table. In some implementations, even when the tables are used, the gateway can still compare the total combined data rate for the user links and ensure that the data rate supported by feeder link conditions equals or exceeds the combined data rate for the user links. If not, the gateway system can shift one or more of the user link MODCODES to lower orders (e.g., a lower number of bits per symbol) so that the data rate for the feeder link matches the combined data rate for the user links.

The gateway system allocates bits in each symbol to the respective user bitstreams that are transmitted. For example, out of 7 bps transmitted on the feeder link at a current feeder link SINR, the gateway system can allocate 4 bits of each symbol to the first user link and allocate the remaining 3 bits of each symbol to the second user link. In some implementations, the bits for one forward user link are encoded in the I channel, and the bits of the other forward user link are encoded in the Q channel. However, this is optional and one or more user links may have bitstream data represented in multiple of the I and Q channels, and/or multiple user links can have at least some of their bitstream data represented in a single one of the I or Q channels.

To create each symbol to be transmitted on the feeder link, the raw binary streams may be sampled at a rate that provides the desired overall data rate (e.g., 7 bps given the current feeder link conditions). Thus, for each feeder link symbol period, the gateway system can extract 4 bits from the bitstream for the first user link and extract 3 bits from the bitstream for the second user link, and then modulate the combined 7 bits by mapping those 7 bits to a symbol in the universal constellation. In this example, 7 bps is less than the maximum data rate (e.g., 8 bps) for the universal constellation of 256-QAM, so the gateway system selects the symbol to represent the 7 bits to be transmitted from among a 128-symbol subset of the universal constellation. For the next symbol to be transmitted on the feeder link, the gateway system extracts the next 4 bits of from the bitstream of the first user link and the next 3 bits from the bitstream of the second user link, and selects a symbol for this next set of 7 bits. The gateway system selects a second symbol in order to represent this second set of 7 bits, where the second symbol is selected from among a 128-symbol subset of the universal constellation. However, the selection can be made from among a different subset of symbols than was used to select the previous symbol. For example, the second symbol can be selected from among the 128 symbols in the user constellation that were not in the subset from which the first symbol (e.g., the immediately previous symbol transmitted on the feeder link) was selected. In this manner, the gateway system can alternate between or cycle through using distinct, same-sized subsets of the universal constellation when creating a sequence of symbols to be transmitted on the feeder link.

The transmitted symbols can be created so the satellite can distribute the bits of received symbols based on the pattern or allocation in which the data of each symbol is sourced from the user links. For example, the gateway system may transmit symbols that include 4 bits from a first user link and 3 bits from a second user link. The satellite can then extract 7 bits from each symbol received (even if the symbols are for a universal constellation that can permit a higher number of bits per symbol. Based on information indicating the current pattern or allocation of those the satellite can then remodulate the four bits for the first user link using the modulation selected by the gateway for the first user link, and remodulate the remaining three bits for the second user link using the modulation selected by the gateway for the second user link. In some implementations the gateway system provides messages or control information that specifies the modulations to be used for the forward links and also specifies the split or assignment of different portions of each feeder link symbol to the respective user links.

By using a predetermined pattern for spitting data from feeder link symbols among the user links, when performing decoding the satellite can determine which bits are provided for transmission to which user links. Any of various defined patterns for splitting bits among user links may be used (e.g., 4 bits/4 bits, 4 bits/3 bits, 3 bits/4 bits, 3 bits/3 bits, 3 bits/3 bits/2 bits, and so on) as long as the satellite has access to the predefined pattern. For example, the satellite can be informed by the gateway system in a code, instruction, or other control data. For any bit pattern used to multiplex the two (or more) binary streams, the output from the feeder link constellation mapper or modulator of the gateway system may be I and Q signals that are used by an RF front-end of the gateway system to create an RF signal for transmission to the satellite. The modulation used is a higher-order (e.g., higher number of bits per symbol) than the lower-order modulations that are designated for the individual user links (e.g., determined at block 515 or determined by look-up from the tables that indicate MODCODES for different feeder link and user link SINR levels). Specifically, the data rate per symbol of the higher-order modulation is at least as great as the sum of the data rates of the lower-order modulations to be used for the user links.

In a TDMA system, the satellite changes the recipient terminal of transmitted user link data frequently, according to the assignment of the time slots. Different recipient terminals may also have different SINR levels and thus may support or need different data rates per symbol. As a result, the gateway system can schedule transmissions and assign time slots to the various terminals in different user beams, and then set different feeder link modes used (e.g., 8-bps, 7-bps, 6-bps, etc. modes of using the universal constellation) and/or different user link MODCODES and data splits among user link channels. The user link MODCODES used can vary from one time slot or sub-slot to the next when one or more of the user links changes from being allocated to one terminal to another. Thus, the SINR determination for terminals and table lookups for MODCODE assignments to user links can change in the TDMA frame as different combinations of user terminals across the supported user links are allocated time slots, and each terminal has its own SINR level. The SOF field data, or other control data that the gateway system includes in the feeder link data stream, can provide the information that the satellite needs to extract data from the feeder link (e.g., the number of bits per feeder link symbol and how feeder link data is split among different user links), and to determine the appropriate MODCODES and recipient terminals for each user link. The feeder link data stream indicates the changes over time as there are changes in the user link MODCODES for user links, changes in which terminals are being transmitted to, changes in SINR, and so on.

At block 530, the symbols for the forward feeder link are transmitted by the gateway system to the satellite. The gateway system can consistently use the same universal constellation to provide data over the feeder link, as discussed above. Nevertheless, the same set of symbols (e.g., 256-QAM symbols) transmitted on the feeder link may be used for different data rates per symbol or different feeder link modes that have different levels of robustness to noise and interference.

Figure 6:
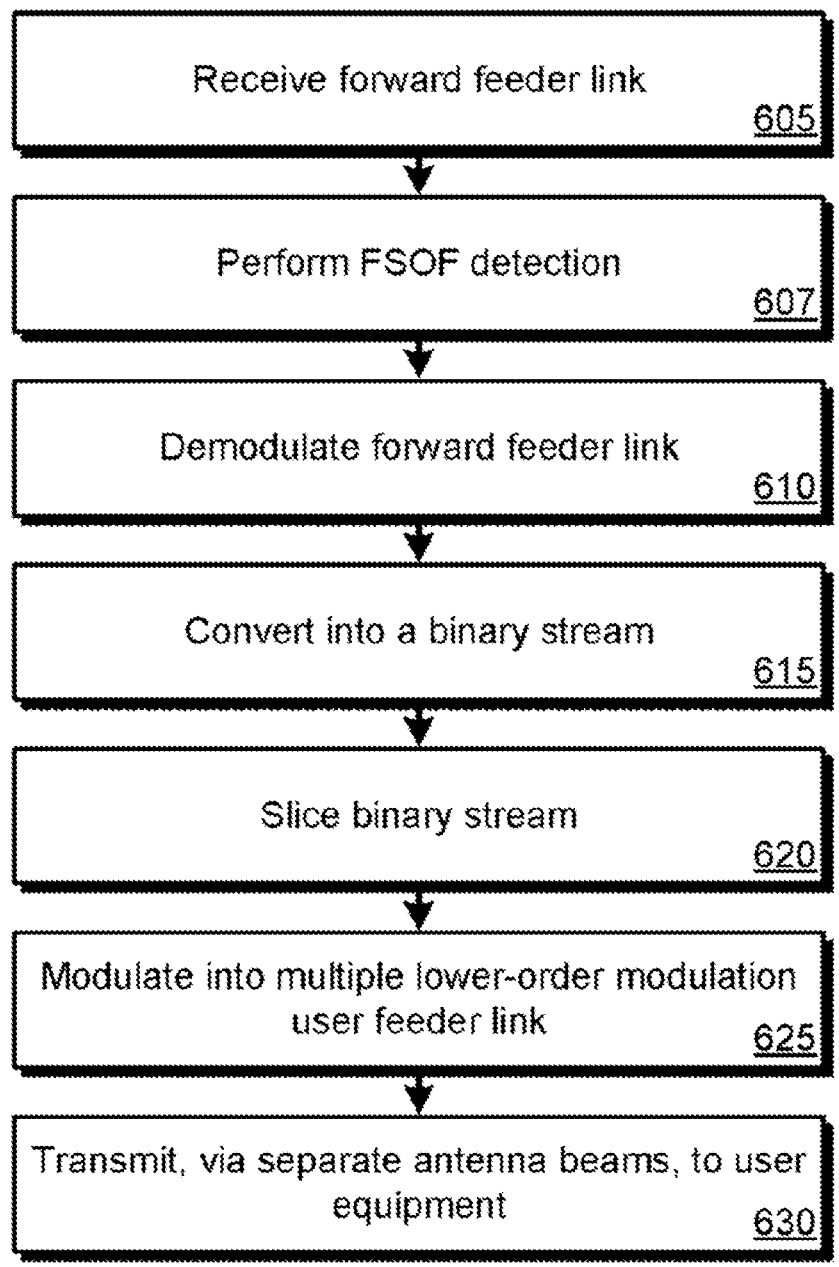
FIG. 6 illustrates an example of a method for performing forward-link transmodulation at a satellite for transmission to user equipment.

FIG. 6 illustrates an example of a method 600 for performing forward-link transmodulation at a satellite for transmission to user equipment. Method 600 may be performed using the system 100 of FIG. 1 and forward link satellite transmodulation system 300 of FIG. 3.

Each block of method 600 may be performed by forward link satellite transmodulation system 300. The method 600 may be performed in concert with the method 500. That is, the method 500 and the method 600 can be combined to a single method that is performed together by the satellite and the gateway.

At block 605, the satellite receives transmissions from the gateway system on the forward feeder link. The received transmissions can be encoded or modulated using the universal constellation. In some embodiments, the received analog signal is processed and converted to a digital signal. Block 605 can involve initial amplification, conversion, and processing by an RF front end of the satellite. In some ways, the feeder link is non-standard, and includes FSOF data that At block 607, the satellite detects and interprets the feeder link SOF (FSOF). The FSOF indicates the beginning of a new data sequence being transmitted. The FSOF also specifies important parameters for using the feeder link data, such as the modulations should be used for the user links, the terminals to receive the user link data, and the split of bits among the user links. The FSOF is provided in the feeder link in the place of typical user-link SOFs that are transmitted on user links according to the DVB-S2 standard when multiple user data streams have the same frame length. Information from and timing based on the FSOF may be used to determine the number of forward user links to be created, how bit slicing should be performed (e.g., how to distribute bits of feeder link symbols among the different user links), and the types of modulation to be used for the user links.

At block 610, the forward feeder link is demodulated into I and Q signals. These I and Q signals are passed to a binary coder. As discussed above, the use of a universal constellation means that the demodulator of the satellite does not need to detect different feeder link modulations or switch to demodulate transmissions made with different types of modulation. The satellite can consistently demodulate to recognize the symbols in a single constellation (e.g., 256-QAM).

At block 615, the satellite uses the symbols identified from the feeder link to generate a bitstream. Although the feeder link consistently uses the single universal constellation, the system still allows the effective data rates per symbol to vary as the feeder link SINR varies. This means that a given 256-QAM symbol received on the feeder link may represent a variable amount of bits (e.g., 8 or fewer bits of information), since the universal constellation may be used in different modes for 8 bps, 7 bps, 6 bps, etc. The information that the satellite extracts from the FSOF can specify the mode in which the feeder link is being transmitted.

As an example, the FSOF may indicate that the feeder link is being used in a 7 bps mode, which would enable the 256-QAM constellation to be used in a way that emulates or approximates a 128-QAM constellation. As a result, the satellite extracts only 7 bits from each feeder link symbol. The eighth bit corresponding to the symbol is discarded, as it does not represent any transmitted bits and instead represents spacing in the constellation that helps limit confusion with other symbols. For example, a predetermined bit position, such as the first bit in the sequence can be designated to be omitted in the 7 bps mode, so that the symbol for "10000000" and the symbol for "00000000" are both interpreted as a value of "0000000" in the 7 bps mode. The assignment of bit sequences to symbols in the constellation can be made with a Gray code or other arrangement so that, at least for some symbols or regions of the constellation, adjacent symbols vary in the value of single bit position. For example, the first bit position may select between adjacent rows or columns. For example, the symbols for 10000000" and "00000000" can be symbols next to each other in adjacent rows or columns, and removing the need to receive the first bit accurately provides additional margin for reception of the remaining bits.

Thus, while a symbol in the same universal constellation is received each time (e.g., a symbol in a 256-QAM constellation), the feeder link symbols may represent and be converted to different numbers of bits based on the mode in which the universal constellation is used. A raw stream of binary data is output. No buffering may be needed at the satellite since a hard decision based on the symbol is used to immediately output raw binary data. Lack of buffering may help decrease power usage at the satellite and cost of the satellite.

At block 620, the raw stream of binary data is sliced or demultiplexed. Information in the binary data indicates how data is encoded into the symbols. In the case that fixed frame length is used, the complex FSOF indicates how data is encoded on the I and Q axes. In the case that a fixed code length is used, separate modulation-indicating SOF (MSOF) data are provided for each of the I and Q axes. The FSOF or MSOF data carries the information of how data is encoded into the symbols, which can be used to accurately demultiplex the binary data into two (or more) binary streams that each correspond to a particular forward user link. For example, if a universal constellation for 256-QAM is used in a 7 bps mode to provide data for two forward user links, the first four bits of each symbol may be defined to correspond to the first forward user link, and the last three bits of each symbol may be defined to correspond to the second forward user link, and the last bit of each symbol can be discarded. The same information carried either by FSOF or MSOF will also be applied to remodulate each individual binary stream after bit slicing.

The satellite can also enhance and complete each bitstream that is demultiplexed. For example, the satellite can generate and insert appropriate user link SOF data into the bitstream, so that each bitstream complies with the DVB-S2 standard or other format expected by the terminals.

At block 625, the satellite modulates each bitstream that corresponds to a forward user link with the appropriate modulation for that user link. For example, the satellite uses the modulations specified by the FSOF for the respective user links. The specific modulation used for data addressed to a particular UE may be selected by the gateway system based on SINR of the satellite's forward user link, as received by the particular UE, and the forward feeder link SINR.

For DVB-S2, a first very low-level modulation may be used for a packet header (PLHeader) such that all UEs can read the packet header. A second modulation would be used for the payload. Modulation for each forward user link occurs independently, therefore, at a given time, the same or different lower-order modulations may be used concurrently for a set of forward user links.

At block 630, each modulated forward user link is transmitted by the satellite via an antenna of the satellite to UE on earth. Each forward user link may be transmitted using the same frequency to different geographic regions or to the same or overlapping geographic regions using different carrier frequencies.

Figure 7:
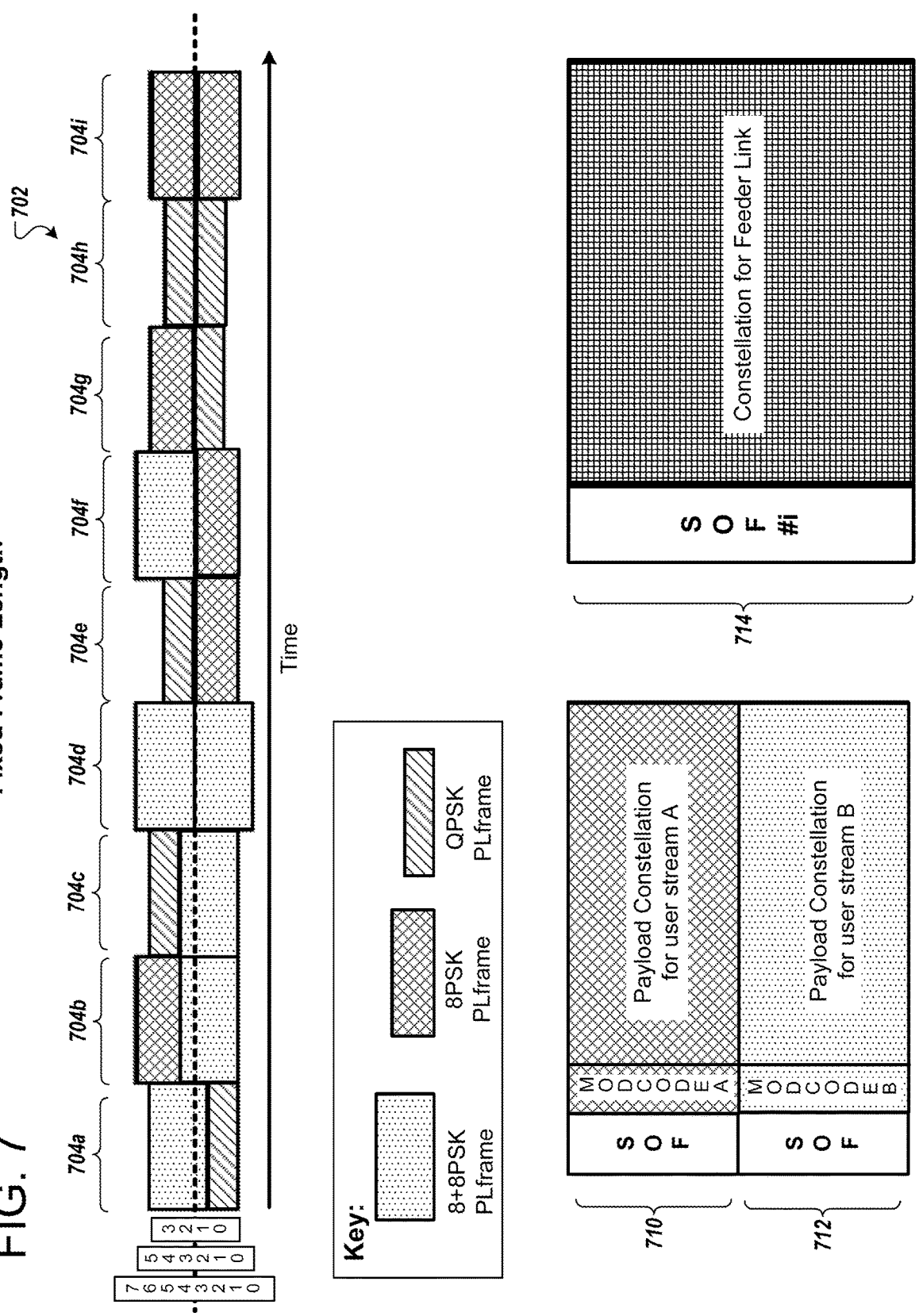
FIG. 7 illustrates an example of frame structures for forward-link transmodulation using a fixed frame length for each individual user stream

FIG. 7 illustrates an example of frame structures for forward-link transmodulation using a fixed frame length. FIG. 7 shows different combinations of the number of bits can be supported at the feeder link for a frame structure 702 with fixed frame length. In the example, there are three different user link modulations that are available for each user link: 8+8PSK providing 4 bps, 8-PSK providing 3 bps, and QPSK providing 2 bps. Optionally, another modulation of BPSK for 1 bps could be made available as an additional option.

The modulation used for each user link can be determined based on the SINR of the terminal assigned to use the user link at the time. The modulations for the user links can be set separately, and different combinations of user link modulations can be set. For example, there are 3*3=9 different combinations of two bitstreams for a transmodulation feeder link. In the figure, an example frame 702 shows a sequence of transmission periods 704a-704i, each with a different combination of the three user link modulations being used. The characteristics of the different transmission periods are indicted in Table 1 below. In the column at the far right, the combined data rate indicates the minimum data rate that the feeder link needs to support for that combination of user link modulations.

TABLE 1

| Transmission Period | First User Link Modulation/ Data rate | Second User Link Modulation/ Data rate | Combined Data Rate |
|---|---|---|---|
| 704a | 8 + 8PSK/4 bps | QPSK/2 bps | 6 bps |
| 704b | 8PSK/3 bps | 8 + 8PSK/4 bps | 7 bps |
| 704c | QPSK/2 bps | 8 + 8PSK/4 bps | 6 bps |
| 704d | 8 + 8PSK/4 bps | 8 + 8PSK/4 bps | 8 bps |
| 704e | QPSK/2 bps | 8PSK/3 bps | 5 bps |
| 704f | 8 + 8PSK/4 bps | 8PSK/3 bps | 7 bps |
| 704g | 8PSK/3 bps | QPSK/2 bps | 5 bps |
| 704h | QPSK/2 bps | QPSK/2 bps | 4 bps |
| 704i | 8PSK/3 bps | 8PSK/3 bps | 6 bps |

If BPSK is included as an option, there would be 4*4=16 different combinations of user link modulations, and a range for the combined data rate of two streams from 2 bps to 8 bps. In addition, if the gateway and satellite were configured to provide three or more user links (e.g., three or more beams), then even further combinations would be possible.

Given the significant number of different user link modulations and different levels of feeder link bandwidth that may be needed, conventional systems would typically need a variety of different feeder link constellations for the many different situations. However, the present technology enables a single fixed constellation for the user link to be used for all of the different combinations of user link modulations.

In order to make the system as simple as possible and reduce onboard signal processing on the satellite, no additional symbols for synchronization are inserted in the feeder link, which allows the forward feeder link symbol rate to be the same as the forward user link symbol rate. In some implementations, the feeder link uplink symbol rate is the same as the user link downlink. It is not a trivial task for the demodulator at receiver side with no additional synchronization symbols inserted for a system with potentially 16 or more different constellations. Nevertheless, by using a universal constellation, the satellite can use a demodulator that consistently demodulates a fixed constellation at the feeder link to cover all the different combinations of user links and data rates supported.

For both of the user links, the gateway can change the user link modulation assigned to be used in response to changes in the SINR of the terminal designated to receive the user link transmission. The frame structure in FIG. 7 shows the complexity that the gateway system handles in assigning user link modulations, which can change frequently. For example, the different user links (e.g., different satellite beams) have modulations set separately. Within each user link, the TDMA operation varies which terminal in the satellite beam coverage area is assigned to receive data, and different terminals may have different SINR levels and thus different user link modulation needs. In addition, even for a single terminal in a user beam, the SINR may vary over time.

In the example of FIG. 7, an example of transmitted signals for a time period is also shown below, with first user link signals 710, second user link signals 712, and feeder link signals 714. These can represent in further detail the time period 704b, where the first user link uses 8PSK and the second user link uses 8+8PSK. In many cases, the SOF or FSOF uses a different modulation than the payload or even other header information. The gateway can take information to be transmitted, whether as modulated for a user link or simply in digital form, and combine the information for the first user link and second user link into the feeder link signals 714. This can include creating and adding a custom FSOF that is different from the SOF that would typically be used according to the applicable format or standard for the user links. The FSOF can be created to fit in the same length or field size (e.g., number of bits) as the standard SOF for the data stream. The processing to convert from the first user link signals 710 and second user link signals 712, with their user link SOF field values, to the feeder link signals 714 and the FSOF field values can be done at a transmitter signal processing module for feeder link forward link transmission at that ground section, such as at the gateway or data center in communication with the gateway.

As an example, in order to support four user link modulation for both I and Q channels, there are in total 8 FSOF pseudorandom sequences (e.g., 4 for the I channel plus 4 for the Q channel) as discussed earlier. The FSOF carries information about how to slice the bits, in addition to timing, frequency, and phase information for the on-satellite demodulator. The FSOF also carries information about how to remodulate each individual user frame on satellite when the bits are sliced.

The FSOF modulation (e.g., the modulation used to transmit the FSOF) can be BPSK for the I channel and BPSK for the Q channel. The BPSK constellation will be the outermost row or outermost column of the high-order feeder link constellation. Because the FSOF for I and Q will align in time, the final constellation looks like QPSK, and there will be 16 different combinations if treated as QPSK. The FSOF can be detected separately for either the I channel or Q channel as BPSK, or can be detected as QPSK for both the I channel and Q channel.

FIG. 8 illustrates an example of frame structures for forward-link transmodulation using a fixed code length. In the example of FIG. 8, different combinations of user link modulations and data rates are shown in a frame structure 802. Unlike the example of FIG. 7, however, the different user links may change their modulations, and thus data rates, at different times and may not be aligned. In other words, the two user links may change modulations at different times, so the two user links are not aligned to the same frame boundaries. There can be many combinations of different user link modulations used concurrently, e.g., 9 or 16 combinations as discussed for FIG. 7. The codeword lengths are maintained consistent within each user link and are the same for each of the user links. Nevertheless, the differences in modulations used for the user links result in different transmission durations for the codewords, which can be seen between user links and also within a user link at different times.

The added complexity of not aligning the user links to the same frame boundaries results in differences in the processing done by the gateway to create the feeder link data. FIG. 8 shows representations 810, 820, 830 that illustrate the process of creating the transmission for the feeder link.

Initially, the first representation 810 shows two data streams, one for the first user link at the top and another for the second user link at the bottom. For each user link, the data streams are designated to be transmitted with different modulations at different times. For example, the upper data stream shows that the first user link initially has data designated for transmission with QPSK, then a SOF (which may be modulated in or may be designated for a different modulation, such as BPSK), then data to be transmitted with 8PSK, then another SOF, then data for transmission with 8+8PSK, and so on. The gateway changes the data in the streams to create the data streams in the second representation 820. In particular, the gateway replaces each SOF in the standard DVB-S2 format and modulation with a modulation indication start of frame (MSOF) with information to assist in the transmodulation process. In addition, the MSOFs can be designated for the same modulation as the accompanying payload data, rather than a separate modulation for the SOF. The processing to modify the SOF field values, as shown in representation 810 to representation 820, is done at a transmission signal processing module for feeder link forward link transmission at a ground section, such as at the gateway or a data center depending on implementation choices. Similarly, the processing to convert from the signals shown in representation 820 to representation 830 can be done at the gateway or data center.

The MSOF will use low order modulation for its reliability, and the modulation used may be different from the payload modulation. For example, each bit of the binary sequence MSOF can be mapped to the outermost row for the Q channel and to the outermost column for the I channel, which is similar to BPSK for the I channel or the Q channel. The bit sequence used for the MSOF can be a pseudorandom sequence, and a predetermined set of pseudorandom sequences can be defined in advance to represent different configurations (e.g., each representing a different modulation for the user link). If there are four modulations possible for each user link, the system will need 4 MSOFs for the I channel and 4 MSOFs for the Q channel. The MSOF will help to solve the phase ambiguity of the on-satellite QAM demodulator for the same code length case (e.g., as shown in FIG. 8). Because the MSOF for the I channel and the Q channel will not align, they must be detected for the I channel and the Q channel separately on the satellite.

Once the MSOFs have been inserted, the gateway uses the techniques above to multiplex the two user link bitstreams onto the feeder link. For example, with the user constellation, the constellation used for the feeder link can provide a throughput that can support any and all of the combined data rates of the user links, if the feeder link SINR is sufficient. A single symbol constellation is used consistently for the feeder link, as represented by the consistent shading across the entire representation 830. Nevertheless, the effective data rate or throughput can be varied even as this constellation is used. As discussed above, the mode in which the constellation is used can fall back to a lower per-symbol data rate than the maximum supported by the symbol constellation, when needed to account for a lower feeder link SINR.

FIG. 9 illustrates examples of tables 910, 920, 930 for selecting user link modulations and codings based on user link SINR and feeder link SINR. The tables in FIG. 9 show various possible levels of bits per symbol for one user data steam. The gateway can use the tables to select the appropriate modulation and coding (MODCODE) for each terminal based on the feeder link SINR and the terminal's SINR report.

FIG. 9 includes three tables 910, 920, 930, each of which corresponds to a different feeder link SINR. The tables are based on additive white Gaussian noise (AWGN) simulation for a transmodulation system. Each table 910, 920, 930 provides the MODCODES that can be used to perform ACM for a user link at different level of feeder link SINR. Each table has four columns: a user link SINR threshold in dB, a MODCODE (specified as a modulation and code rate), a code rate, and a number of bits per symbol.

To use the tables, the gateway determines the feeder link SINR. If the feeder link SINR is 26 dB or greater, the first table 910 is selected. If the feeder link SINR is less than 26 dB but at least 23 dB, the second table 920 is selected. If the feeder link SINR is less than 23 dB but at least 20 dB, the third table 930 is selected. The gateway then uses the selected table to assign a MODCODE using the thresholds in the first column. The SINR can be a minimum threshold at which to use the corresponding MODCODE in the row, and the gateway can select the highest code rate that the user link SINR support.

As an example, the gateway may determine that the feeder link SINR is 24 dB, and as a result the gateway selects the second table 920, because the feeder link SINR satisfies the minimum SINR threshold level for the table (e.g., 23 dB) but does not reach the higher minimum threshold level to be able to use the first table 910. The gateway may have two terminals in different user beams to transmit data to, and the gateway then looks up the MODCODEs for these terminals based on the user link SINRs. If the first terminal has a user link SINR of 8.5 dB, the gateway selects a MODCODE of 8PSK and a 3/4 code rate (e.g., the minimum threshold of 8.13 dB is the highest threshold satisfied). If the second terminal has a user link SINR of 11 dB, the gateway selects a MODCODE of 8PSK and 8/9 code rate (e.g., the minimum threshold of 10.85 dB is the highest threshold satisfied).

The tables help to balance the throughput of the gateway to the satellite on the feeder link with the combined throughput of the satellite to the terminals in the two or more associated user links. In general, with a universal constellation of 256-QAM, a feeder link modulation making full use of the 256-QAM throughput (e.g., 8 bps) and user link modulation of 8+8PSK (e.g., 4 bps per user link) can be supported when feeder link SINR is at least 26 dB, and if the user link SINR levels are high enough. When feeder link SINR is maintained at 26 dB or higher, the feeder link can always support full capacity of the 256-QAM constellation. Nevertheless, according to the table 910, if a user link SINR drops to below 6.5 dB, that user link can only support a lower order modulation (e.g., 8PSK, providing 3 bps).

To reduce implementation complexity, when the feeder link is not using the full 8 bps capacity of the universal constellation, the gateway can send one or more random bits to fill the bit sequence being sent on the feeder link. For example, one user link may have the SINR to support 4 bps, and a second user link may have a SINR sufficient to only support 3 bps. The gateway can encode each feeder link symbol to include 4 bits for the first user link and 3 bits from the second user link, and can fill in one random bit for each symbol to obtain the 8 bits per symbol used to select a symbol of the universal 256-QAM constellation.

However, when the feeder link SINR drops significantly, such as to 20 dB, the feeder link can only support a 6 bps mode (effectively emulating a 64-QAM modulation with the universal constellation) on the feeder link. This limits the maximum user link modulation to 3 bps per user link (e.g., 8PSK), which represents a significant drop in system capacity, even though the user link SINR may still be high and might support a 4 bps modulation. In this situation, the SINR of the feeder link constrains the overall capacity available for the user links. As a result, a user link SINR of 10 dB would yield only a 3 bps user link modulation in the third table 930 (for a 20 dB feeder link SINR), while the same user link SINR of 10 dB would yield a 4 bps user link modulation in the first table 910 (for the 26 dB feeder link SINR). In the case of the 20 dB feeder link SINR, the gateway alternates or cycles through four distinct 64-symbol subsets of the total 256 symbols in the 256-QAM universal constellation. This technique will maintain reliable connections with a throughput as high as conditions allow, while also maintaining a virtual 256-QAM operation on the feeder link.

For the case when the feeder link SINR is 26 dB or higher, the table 910 allows each user link to have up to 4 bps. The feeder link supports maximum throughput using the universal constellation for this level of feeder link SINR (e.g., a 256-QAM mode providing 8 bps), so two user links can be provided at the highest user link throughput levels (e.g., combined user link throughput can be 2*4 bps=8 bps, which is supported for the 26 dB feeder link SINR). Similarly, when the feeder link SINR is from 20 dB to 23 dB, the table 930 allows each user link to have up to 3 bps, and the combined user link throughput for two user links would be 2*4 bps=6 bps, which is supported by the mode in which the universal constellation is used to emulate 64-QAM operation to provide 6 bps. In these cases, two user links at the maximum throughputs indicated by the tables will not exceed the available throughput of the feeder link.

In the case where the feeder link is between 23 dB and 26 dB, the table 920 indicates that a user link can have a throughput of up to 4 bps if the user link SINR is sufficient, but the feeder link supports only 7 bps in a virtual 128-QAM mode of using the universal constellation. This means that if the two user links both have very high user link SINR levels, assignments based on the table 920 to allocate 4 bps to two user links could potentially exceed the 7 bps feeder link capacity. It is desirable to enable one of the user links to carry data at the maximum 4 bps to utilize the full capacity of the feeder link. The gateway can perform a check to ensure that the combined data rate for the user links is not greater than the feeder link data rate. For example, even if both user link SINR levels support 4 bps, the gateway can ensure that only one user link is assigned a 4 bps data rate. The other user link is assigned a lower 3 bps data rate, even if the user link could support 4 bps, so that the combined data rate does not exceed the feeder link throughput capacity.

For on-board signal processing to recover the hard decision bits in the satellite, several traditional signal processing modules will be included, e.g., IQ imbalance and DC offset removal, automatic gain control, timing estimation, and frequency estimation. With the feeder link universal constellation, these traditional signal processing modules will be able to recover symbol timing and frequency even without any known synchronization symbols. Afterward, different feeder link start of frame (SOF) patterns can be searched and detected at the symbol rate. FSOFs and MSOFs will help to detect the phase ambiguity. Different feeder link SOF content is used by the satellite to determine how to slice the received feeder link bits into two streams and remap them into different constellations for individual user beams. For fixed code length frame structure as shown in FIG. 8, there are no additional predetermined symbols inserted for synchronization in order to maintain the same symbol rate. Using a fixed symbol constellation for the feeder link will make synchronization easier between the gateway and satellite, and hard decision-directed phase-locked loop (H-DD-PLL) can be used. In addition, the hard decision module only needs to store one constellation to generate hard decision bits.

The technique of using the universal constellation can be used with the constraint that no additional symbols are inserted for synchronization other than the feeder link SOF, which replaces the DVBS2 SOF at the gateway and will be replaced by DVBS2 SOF on the satellite. This approach helps to maintains same symbol rate in the forward data path of feeder link and user link. The constraint avoids the need for symbol rate conversion on the satellite and reduces the amount of demodulator signal processing on satellite that is needed to recover the raw bits. By keeping the constellation at the feeder link fixed, the universal constellation concept can help to reduce DPD predistortion training cases at gateway and number sets of coefficients to be loaded in corresponding to different operation points of the high power amplifier (HPA) at the gateway.

For a transmodulation system, the higher feeder link signal-to-noise-plus-interference ratio (SNIR) will lead to high spectrum efficiency due to low uncoded bit errors on the satellite. For a multiple carrier gateway system, the nonlinearity of the high power amplifier (HPA) will introduce both in-band and out-of-band interference. In order to achieve high feeder link SNIR, signal predistortion is used at the gateway to reduce adjacent channel interference (ACI) or intermodulation distortion (ID) introduced by nonlinearity of a traveling-wave tube amplifier (TWTA). For a DPD system, the coefficients are usually trained at different operating points of the TWTA with a specific constellation. Different DPD coefficients can be loaded at different operating points of TWTA. Theoretically, coefficients would not be expected to be very different for different constellations. Nevertheless, different constellations create different peak-to-average power ratio (PAPR) levels and require different operating points of the HPA, which does cause significant changes in the response of the TWTA. By using the fixed constellation for the feeder link, the DPD training cases will be greatly reduced and coefficients loading at gateway will only be dependent on TWTA's operating point, and not related to changes in modulation or constellation type because the universal constellation is used consistently.

This technology is applicable to all programs involving use of gateways and VSATs over multi-beam satellites. The technique of alternating among subsets of a symbol constellation to artificially create a higher-order modulation or symbol constellation and maintain it consistently in use across multiple modes (e.g., 8 bps, 7 bps, 6 bps, etc.) is different from prior approaches. This enables a single higher-order modulation to be employed to approximate or simulate each of various lower-order modulations, to gain the robustness and accuracy of reception afforded by lower SINR levels while maintaining consistency to simplify demodulation processing in the satellite and RF processing in the gateway. In addition, the technique of alternating through different subsets of the higher-order modulation or universal constellation is also a new approach that enhances reception quality and versatility in the system.

Figure 10A:
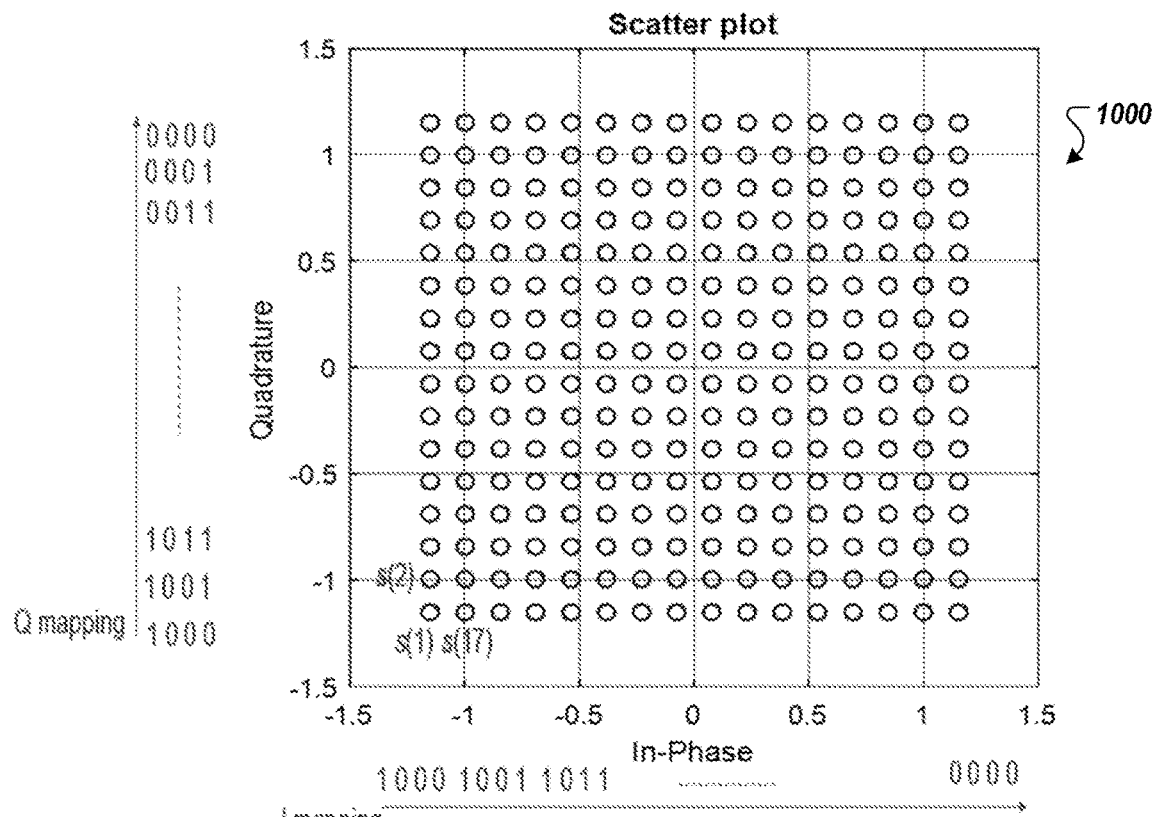
FIG. 10A is a diagram that illustrates a uniformly-spaced constellation.

FIG. 10A is a diagram that illustrates a uniformly-spaced constellation 1000. In particular, the example shows a 256-QAM constellation, which is one example of the type of constellation that can be used as a universal constellation for the feeder link. The QAM modulation arranges constellation points on a uniformly spaced two-dimensional grid. To minimize the uncoded bit error rate (BER), information bits are mapped to various constellation symbols using Gray mapping. Additionally, QAM also permits a straightforward in-phase (I)/quadrature-phase (Q) decoupling of the constellation points, which significantly simplifies demodulation and bit slicing on satellite. As an example, constellation points can be defined as: $s(i)^{QAM}=s_I(j)+\sqrt{-1}\cdot s_Q(k)$, where $i=1, 2, \ldots, 256$, where $j=1, 2, \ldots, 16$, and where $k=1, 2, \ldots, 16$. In addition, $s_I$ and $s_Q$ at the I and Q coordinate locations, respectively, and are defined as:

$$s_I = \begin{bmatrix} -1.1504, -0.9971, -0.8437, -0.6903, -0.5369, \\ -0.3835, -0.2301, -0.0767, 0.0767, 0.2301, \\ 0.3835, 0.5369, 0.6903, 0.8437, 0.9971, 1.1504 \end{bmatrix},$$

and $s_Q=s_I$.

In the example, the in-phase (I) channel is shown along the horizontal axis, and the quadrature (Q) channel is shown along the vertical axis. The constellation has a total of 256 unique symbols, each having a corresponding unique 8-bit data sequence. The position of a symbol along the I channel axis provides four bits, and the position of the symbol along the Q channel axis provides another four bits. Along each axis, the 4-bit sequence represented by that position can be Gray coded. For example, the along both axes, each 4-bit sequence for a symbol differs from the adjacent symbol(s) to the right or left, or up or down, by only one bit. For example, along the first column at the left, starting at the left-hand corner and moving up the first column, the Q-channel bits are "1000" for the first symbol, "1001" for the second symbol, "1011" for the third symbol, and so on up through the 16 symbols in the first column. For each of the symbols in the first column, the I-channel bits are the same, "1011."

Figure 10B:
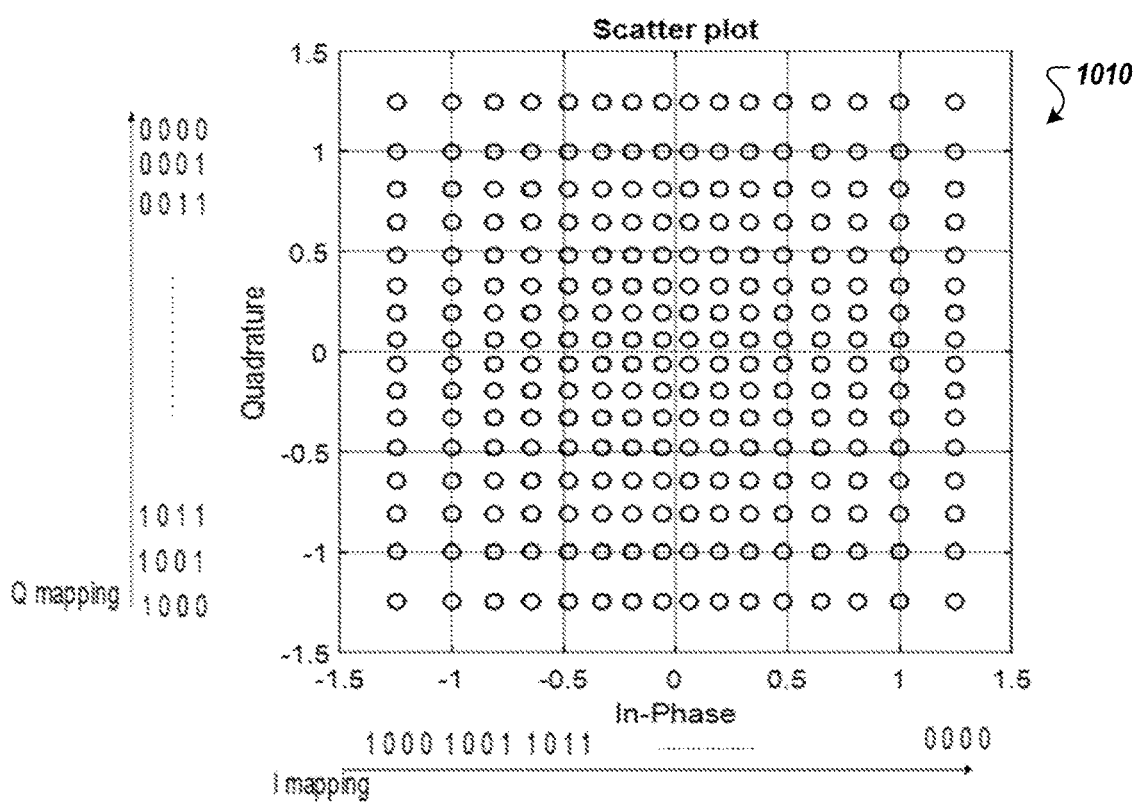
FIG. 10B is a diagram that illustrates a constellation with unequal spacing or irregularity in spacing.

FIG. 10B is a diagram that illustrates a constellation 1010 with unequal spacing or irregularity in spacing. This constellation 1010 is an irregular or unequally-spaced form of 256-ary QAM that provides very good improvements in energy-efficiency over traditional QAM, without requiring any modifications to the Gray labeling or to the demodulation process. Constellation points can be defined as $s(i)^{QAM}=s_I(j)+\sqrt{-1}\cdot s_Q(k)$, where $i=1, 2, \ldots, 256$, where $j=1, 2, \ldots, 16$, and where $k=1, 2, \ldots, 16$. The I coordinates and Q coordinates of the new constellation are given by:

$$s_I^{new} = \begin{bmatrix} -1.2453, -0.9977, -0.8102, -0.6452, \\ -0.4801, -0.3301, -0.1950, -0.0600, \\ 0.0600, 0.1950, 0.3301, 0.4801, \\ 0.6452, 0.8102, 0.9977, 1.2453 \end{bmatrix},$$

and $s_Q=s_I$.

The constellation 1010 of FIG. 10B shows another example of a constellation that can be used for the feeder link. The constellation 1010 can provide improvements in accuracy, such as by allowing accurate reception or higher likelihood of accurate reception at lower SINR levels than permitted using the constellation 1000 of FIG. 10A, at least for signals in some SINR ranges. As shown in the figure, the symbols are spaced more closely together in the center of the constellation 1010, and the distance between adjacent symbols increases progressively moving outward from the origin, e.g., from a center of the constellation. The amount of space between adjacent symbols increases for both the I axis and Q axis. The amount of space between adjacent symbols can increase monotonically in both directions away from the origin (e.g., in the positive and negative directions), along both axes.

Figures 11A, 11B:
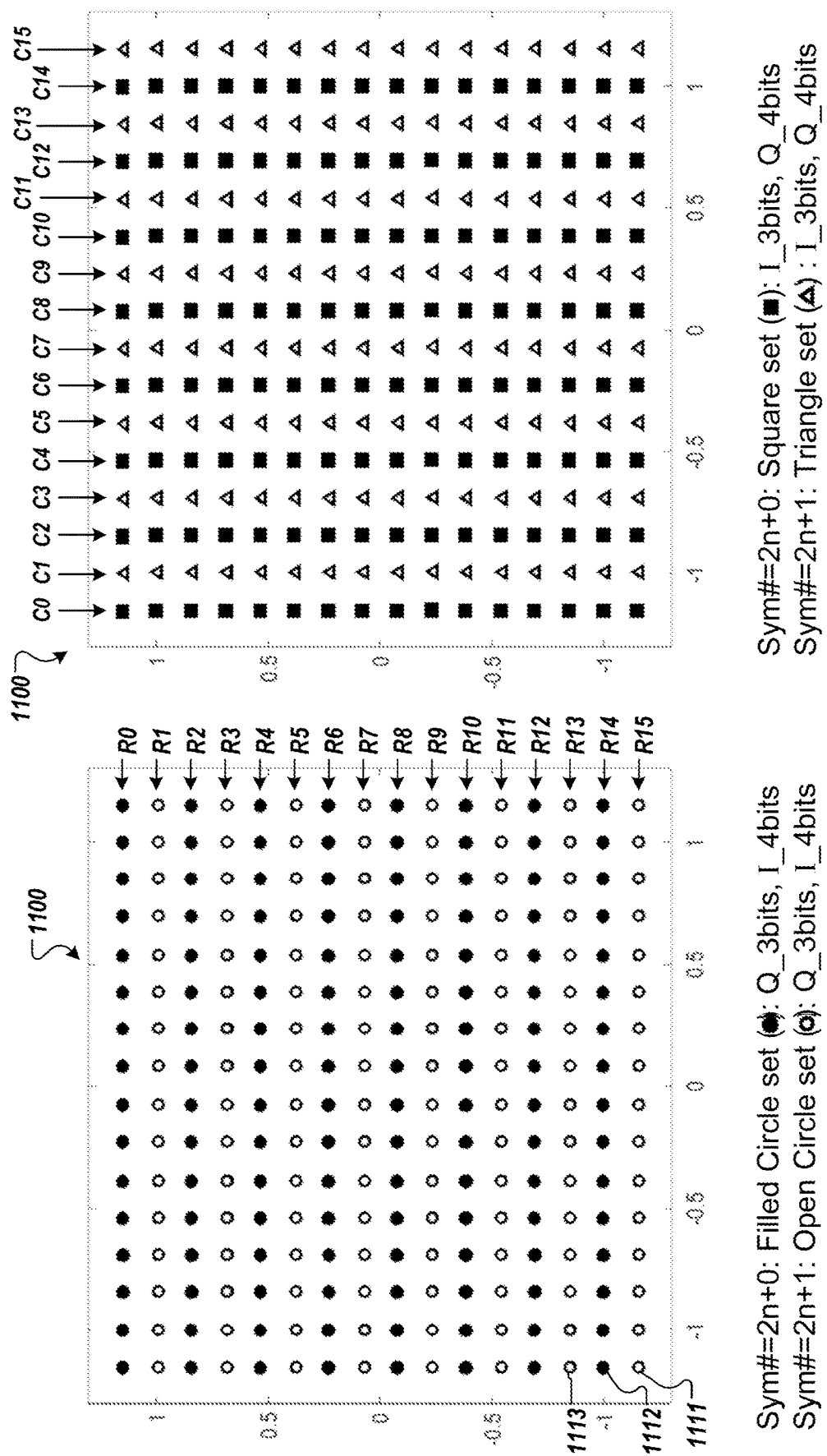
FIGS. 11A-11B are diagrams that show examples of how different subsets of symbols of a universal constellation can be used.

FIGS. 11A-11B are diagrams that show examples of how different subsets of symbols of a universal constellation 1100 can be used. In particular, the figures show how the 256 symbols of a universal constellation 1100 can be divided into different 128-symbol subsets. The gateway can then use the subsets to use the symbols of the 256-QAM universal constellation that approximates 128-QAM to transmit 7 bps instead of the 8 bps maximum data rate of the constellation.

In FIG. 11A, the 256 symbols of the universal constellation are grouped into two distinct subsets by skipping rows. Counting the rows from top to bottom, starting with a row index of zero, a first subset includes the even-numbered rows of symbols (e.g., symbols shown as filled circles), rows R0, R2, R4, etc. A second subset includes the odd-numbered rows of symbols (e.g., symbols shown as open circles), rows R1, R3, R5, etc. The gateway alternates between these two subsets when selecting symbols to transmit on the feeder link in the 7-bps mode. For example, in a sequence of transmitted symbols, for odd-numbered positions in the sequence (e.g., time indices 1, 3, 5, etc.), the gateway selects the symbol to transmit from among the second subset (e.g., open circles in rows R1, R3, R5, etc.). This is indicated in FIG. 11A as using the second subset for symbol numbers 2n+1. For even-numbered positions in the sequence (e.g., time indices 0, 2, 4, 6, etc.), the gateway selects the symbol to transmit from among the first subset (e.g., filled circles). This is indicated in FIG. 11A as using the first subset for symbol numbers 2n+0. As a result, the gateway alternates between the two subsets when selecting symbols for transmission.

By using subsets of the universal constellation, reception at the satellite is more robust. Selecting symbols from among only the even-numbered rows (e.g., open circles) or from among only the odd-numbered rows (e.g., filled circles) effectively provides additional space or margin for demodulation at the satellite. For example, when the subset of symbols used is restricted to one of the subsets shown in FIG. 11A, this removes as a possibility the symbols that would be most likely to be confused along the quadrature axis (e.g., vertical axis). In other words, the nearest symbols along the vertical axis, those in the row above and/or row below, are removed as options for demodulation of the current symbol, making the demodulation decision easier and more robust to noise and interference, even though the symbols used are the same symbols defined for the universal constellation.

As an example, for a given position in a sequence, the gateway can use the second subset (e.g., filled circles in FIG. 11A) to select a feeder link symbol to transmit, and the symbol 1112 can be selected to represent 7 bits of information on the feeder link, and 3 bits will be used for I channel and 4 bits for Q channel.

The satellite can be informed by header information or other control data provided on the feeder link that the 7 bps mode is being used. In addition to its function in aiding synchronization, the feeder link SOF pattern for fixed frame length and MSOF for fixed code length can be used as additional control information. It is desired to keep the symbol rate unchanged to avoid buffering on the satellite, and so in some implementations no additional control data is inserted. Different feeder link SOF (FSOF) patterns will be mapped to the control information, which will be used to identify how many actual bits are transmitted on both the I and Q channels. Both the gateway and the satellite know in advance the predefined alternating pattern when subsets of the universal constellation are used, hence the on-satellite demodulator will be able to extract the correct bits for both I and Q.

The stream can use a predetermined pattern of alternating among the predetermined subsets of symbols, and the pattern can be known to the satellite (e.g., can be fixed in advance for the 7-bps mode or can be indicated in the control data from the gateway). The gateway can also synchronize the start of the pattern with information sent to the satellite (e.g., indicating the first subset for even-numbered symbol positions in the sequence and the second subset for odd-numbered symbol positions in the sequence), or in some implementations the satellite can synchronize based on received symbols. As a result, for the sequence position when the symbol 1112 is transmitted, the satellite can determine that the 7-bps mode is being used and that the transmitted symbol is one of the symbols in the second subset (e.g., filled circles in FIG. 11A). The symbols adjacent to the transmitted symbol 1112 along the quadrature or vertical axis (e.g., symbols 1111 and 1113) are not valid symbols for the demodulation output of that sequence position. Thus, even if noise and interference cause the received transmission to fall between the symbols 1112 and 1113, the satellite's demodulator can still confidently make the decision that the symbol 1112 was the one transmitted. The same benefit of effectively increasing the margin for demodulation is achieved when using the first subset also (e.g., transmitting a symbol selected from among the open-circle symbols, where the satellite demodulator knows that the closed-circle symbols are not valid demodulation results for the current symbol).

When subsets of the universal constellation are used, alternating among the different possible subsets contributes to power efficiency and avoids adding DC bias. If only one subset were used repeatedly, this would introduce a DC bias, which can reduce power efficiency and is undesirable. By alternating among the different subsets, the system avoids the DC bias.

FIG. 11B shows another example of how the symbols of a universal constellation 1100 can be split into distinct subsets. Similar to FIG. 11B, the 256 symbols of the universal constellation 1100 are divided into different, non-overlapping 128-symbol subsets. However, in FIG. 11B, the symbols of the universal constellation are grouped into two distinct subsets by skipping columns. If columns are counted from left to right, with column indices starting at zero, a first subset includes the even-numbered columns of symbols (e.g., symbols shown as squares), columns C0, C2, C4, etc. A second subset includes the odd-numbered columns of symbols (e.g., symbols shown as triangles), columns C1, C3, C5, etc. The gateway can alternate between these two subsets when selecting symbols to transmit on the feeder link in the 7-bps mode, which maps 3 bits to the I channel and 4 bits to the Q channel.

The subsets specified for FIG. 11B are used in the same manner as the subsets in FIG. 11A and provide the same fundamental advantages. In the case of FIG. 11B, the subsets each provide space to reduce potential for confusion along the in-phase (e.g., horizontal) axis, rather than the quadrature (e.g., vertical) axis.

Figure 12:
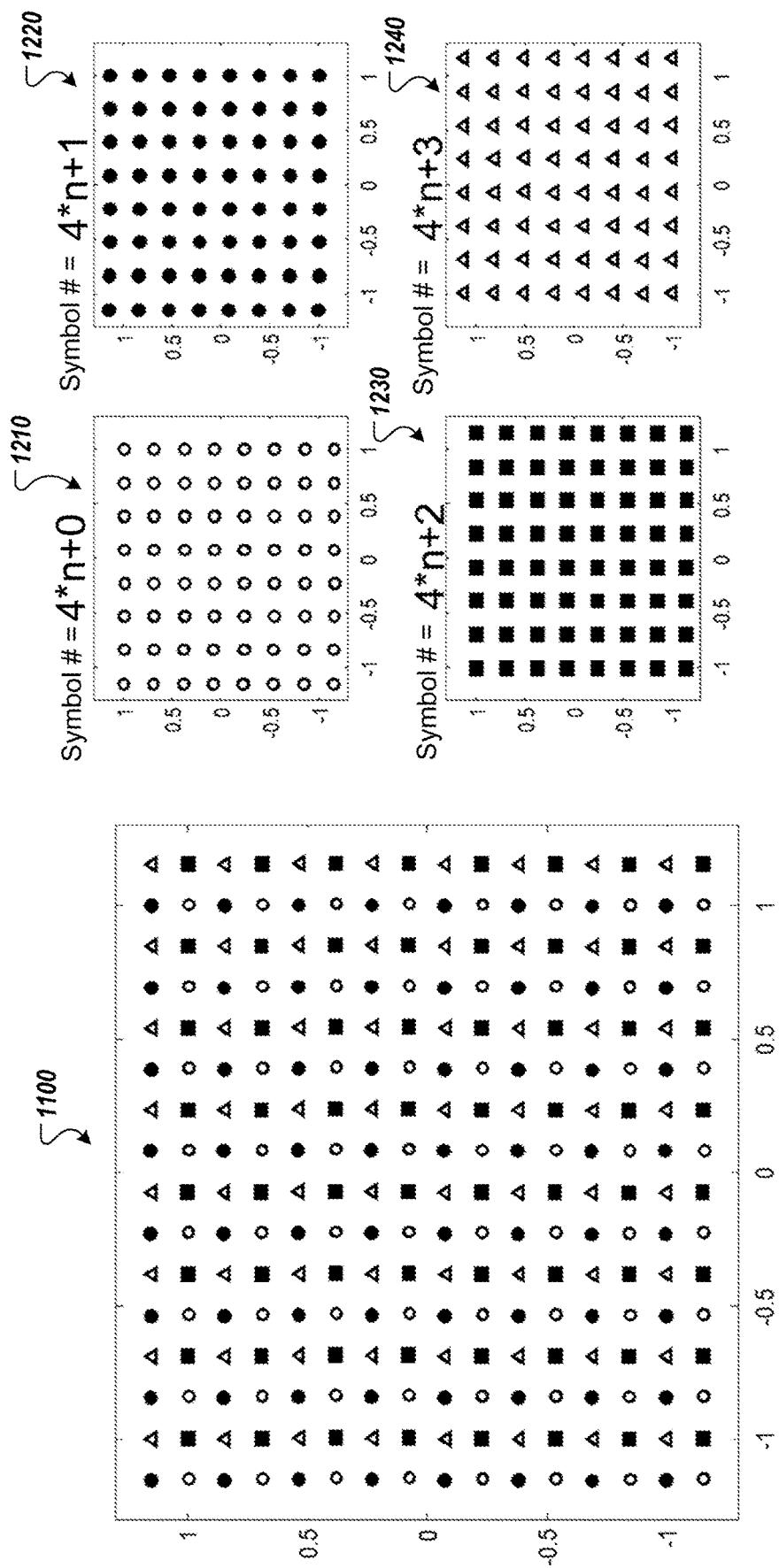
FIG. 12 is a diagram that illustrates an example of how different subsets of symbols of a universal constellation can be used.

FIG. 12 is a diagram that illustrates an example of how different subsets of symbols of a universal constellation can be used. FIG. 12 shows how the example universal constellation 1100 can be used to operate in a 6-bps mode. The 256 symbols in the constellation 1100 are divided into four distinct subsets of 64 symbols. These subsets are shown with different symbols, a first subset 1210 shown with open circles, a second subset 1220 shown with filled circles, a third subset 1230 shown with squares, and a fourth subset 1240 shown with triangles. The subsets are defined to space apart symbols in the subset in both the vertical and horizontal axes, to provide space for the I and Q channels. For example, each subset skips rows and columns, so that each symbol in the subset is spaced apart from other symbols and subsets by one of the omitted rows or columns. The different subsets 1210, 1220, 1230, 1240 each resemble constellations for 64-QAM, but with the symbols offset to align with the positions in the 256-QAM universal constellation 1100.

When feeder link SINR is lowered to a certain range, such as 20 dB to 23 dB, the gateway can select to use the universal constellation 1100 in the 6-bps mode. As with other modes that use less than the full data rate of the universal constellation 1100, this enables a tradeoff to decrease data rate and increase reliability and tolerance for noise and interference, without changing the actual symbol constellation used for transmission by the gateway and without the need to change the demodulation constellation used by the satellite. With the lowered feeder link SINR, even though 256-QAM at 8 bps is not supported, alternating the subsets of the 256-QAM symbols will artificially maintain the feeder link constellation to be 256-QAM symbols with typical 256-QAM signal characteristics, but with hard decision output on satellite having a raw bit error rate that is essentially equivalent to that of 64-QAM. The impact of using the subsets of 256-QAM symbols instead of directly using 64-QAM results in what is typically a negligible decrease in feeder link hard decision bit error probability, and the technique reduces complexity, processing load, and power usage at the satellite significantly.

The gateway cycles through these four subsets 1210, 1220, 1230, 1240 in a predefined pattern when selecting symbols to transmit on the feeder link in the 6-bps mode. For example, for the first symbol in a sequence and every fourth position in the sequence thereafter, the gateway selects the symbol to transmit from among the first subset (e.g., open circles of the first subset 1210). For the second symbol in the sequence and for every fourth position the sequence thereafter, the gateway selects the symbol to transmit from among the second subset (e.g., filled circles of the second subset 1220). For the third symbol in a sequence and every fourth position in the sequence thereafter, the gateway selects the symbol to transmit from among the first subset (e.g., squares of the third subset 1230). For the fourth symbol in the sequence and for every fourth position the sequence thereafter, the gateway selects the symbol to transmit from among the second subset (e.g., triangles of the fourth subset 1240). As a result, the gateway repeats the cycle, switching for each transmitted symbol on the feeder link which of the four subsets is used to select symbols for transmission. The cycle includes switching among the four subsets in the same predetermined sequence (e.g., first subset, second subset, third subset, fourth subset, first subset, second subset, third subset, fourth subset, etc.).

The same techniques illustrated and discussed for FIGS. 11A, 11B, and 12 can be used to provide lower data rates and increased reliability. For each bit lower in data rate, twice the number of distinct symbol subsets is used, and each subset includes half as many symbols within it. For example, where the 6-bps mode cycled through 4 subsets each having 64 symbols, a 5-bps mode can cycle though 8 subsets each having 32 symbols. Similarly, a 4-bps mode can cycle through 16 subsets each having 16 symbols, and a 3-bps mode can cycle through 32 subsets each having 8 symbols, and so on. In this manner, the symbols in the positions of the 256-QAM universal constellation 1100 can be used to provide communication at data rates from 8 bps to 1 bps.

The system may use any of various different techniques for defining the subsets. For example, for the 7 bps mode uses 128-symbol subsets defined by skipping every other row or every other column as shown in FIGS. 11A and 11B. The 6 bps mode uses 64-symbol subsets defined by skipping every other row and every other column as shown in FIG. 12. The 5 bps mode can use 32-symbol subsets that use every fourth row and every other column (or every other row and every fourth column. Another way to consider the eight subsets of the 5 bps mode can be to further divide each of the four subsets in FIG. 12 into two different subsets. For example, if one 64-symbol subset for the 6 bps mode includes the symbols that are in even numbered rows (e.g., R0, R2, R4, R6, etc.) and also in even numbered columns (e.g., C0, C2, C4, C6, etc.), this may be split into two 32-symbol subsets for the 5 bps mode where (1) one subset includes the symbols in one of the rows R0, R4, R8, R12 that are also in the even-numbered columns and (2) the second subset includes the symbols in one of the rows R2, R6, R10, R14 that are also in the even-numbered columns. Alternatively, the same 64-symbol subset may be split differently to generate two 32-symbol subsets where (1) one subset includes the symbols in even-numbered rows that are also in one of the columns C0, C4, C8, C12 and (2) the second subset includes the symbols in even-numbered rows that are also in one of the columns C2, C6, C10, C14. For the 4 bps mode, the 16-symbol subsets can be defined to each include symbols in every fourth row and every fourth column (e.g., a pattern similar to that of FIG. 12, except that in each subset three rows are skipped and three columns are skipped, rather than only one column and one row being skipped in FIG. 12). In a similar manner, for further modes, the subsets can be defined by increasing the spacing between the columns and/or rows used in each subset, e.g., by increasing the amount of rows and/or columns skipped, or by further subdividing the subsets of the mode for the next-highest data rate.

Although FIGS. 11A, 11B, and 12 depict an equally-spaced 256-QAM constellation 1100, the universal constellation may be an irregularly or unequally spaced constellation as shown in FIG. 10B, or may be a constellation of a different modulation (e.g., 128-QAM, 512-QAM, 1024-QAM, etc.). The same techniques can be used to select symbols from among subsets of the constellation, where the subsets are defined to increase space between adjacent symbols in the subset compared to the full universal constellation, and the subsets can be used to employ symbols from the universal constellation in a manner that reduces bit rate transferred per symbol but increases robustness to noise and interference to effectively emulate a lower-order modulation.

FIG. 13 is a flow chart showing an example of a process 1300 performed by a transmodulation system using a universal constellation. The process 1300 can be performed by a gateway, such as the gateway system 110 of FIG. 1.

In step 1301, the gateway powers up. This can include performing a clear sky determination and setting uplink power control settings.

In step 1302, the feeder link SINR is measured. The feeder link SINR can be measured by the satellite, which can send the measured value back to the gateway using telemetry, tracking and control (TTC) functions. The feeder link SINR can also be provided to terminals by waveforms or signals embedded in the downlink to the terminals or the gateway can send an update indicating the feeder link SINR to terminals via a forward control or signaling channel.

In step 1303, the gateway assesses whether capacity satisfies a threshold. For example, the gateway can determine whether total capacity is less than 80%. If capacity is determined to be low, in step 1304 the gateway can inform a control center to switch to another gateway. On the other hand, if capacity is determined to be sufficiently high, the gateway proceeds with step 1305.

In step 1305, the gateway can obtain updates indicating the user link SINR levels for the user links from the satellite to terminals (e.g., VSATs or other UEs). Terminals can update their tables for ranging calculations. Typically, terminals measure their user link SINR and report it to the gateway when initiating a connection. Each terminal also uses the feeder link SINR to assist its decoder. One way that the system can provide this information is to send feeder link SINR information to the terminals via forward link signaling from the gateway.

In step 1306, the gateway loads or selects an appropriate transmodulation ACM MODCODE table according to the feeder link SINR. For example, the gateway selects one of the tables 910, 920, 930 from FIG. 9. In some implementations, the gateway uses a 1 dB granularity for selecting the table. For example, there can be different tables for different 1-dB ranges (e.g., a first table for SINR greater than or equal to 26 dB, a second table for SNIR from dB up to 26 dB, a third table for SINR from 24 dB up to 25 dB, and so on).

In step 1307, the gateway assigns a MODCODE to each of the terminals currently designated or scheduled to receive data. The gateway assigns the MODCODE to each terminal by selecting a MODCODE as indicated in the table for the terminal's measured forward user downlink SINR. The gateway assigns a MODCODE for each of multiple forward user links, such as two different beams of the satellite. If a single gateway's feeder link supports more than two user links, then two user links may be grouped together.

In steps 1308 to 1311, the gateway can use the user link modulations assigned in step 1307, or their bit rates, to determine the feeder link mode to be used (e.g., 8 bps, 7 bps, 6 bps, etc.). The gateway performs processing to balance the throughput of the forward user links with the forward feeder link. As a result, the gateway considers the feeder link SINR as well as the user link SINRs when determining the user link modulations and the feeder link mode in which to use the universal constellation. For example, even if the ACM MODECODE tables indicate certain modulations and corresponding data rates per symbol, the gateway can determine whether the combined throughput of the user links would exceed the throughput of the feeder link, and in response the gateway can assign lower-order user link modulations with lower data rates per symbol. The determinations for steps 1308 to 1311 can be performed for each user link supported by the feeder link. For example, the gateway may determine in step 1308 that 8+8PSK at 4 bps is supported for the first user link, but determine instead that 8PSK at 3 bps is the highest-order modulation supported for the second user link. Many different combinations of user link modulations are supported as discussed above.

In further detail, in step 1308, the gateway determines whether a user link and the feeder link can support 8+8PSK or 4 bps data rate. This may involve checking the MODECODE selected for the user link from the ACM MODCODE tables to determine if 8+8PSK or 4 bps data rate is selected. If this is the case for both user links, then the feeder link symbols are mapped so that four bits are mapped for the first user link and four bits are mapped for the second user link, for a total of 8 bps. If the gateway's feeder link SINR supports the 8-bps mode, then this is allowed and the throughput of the feeder link matches the combined throughput needs of the two user links. Both user links would be mapped to the feeder link using the technique indicated in step 1312, e.g., where one user link has 4 bits per symbol mapped to the I channel, and the other user link has 4 bits mapped to the Q channel.

If the 8+8PSK or 4 bps data rate is not supported by one or more terminals, then, then a lower modulation with lower data rate per symbol may be supported, e.g., 8PSK, QPSK, or BPSK. The gateway attempts to determine the maximum data rate per symbol that each terminal's user link characteristics can support.

In some cases, only one of the user links supported by the feeder link can support 8+8PSK or 4 bps, or the feeder link SINR may not support the full 8 bps mode of the universal constellation. In this case, one user link can have 4 bits per symbol mapped to either the I channel or the Q channel, and the other user link can be stepped down to a lower-order user link modulation, such as 8PSK 1309 as long as the user link SINR and feeder link SINR support it. For example, with a 4 bps/3 bps split, the gateway can use the technique discussed and illustrated for FIG. 11A, with the 4 bps user link being mapped to the I channel and with the 3 bps user link being mapped to the Q channel. As discussed for FIG. 11, this technique selects each feeder link symbol from a subset having only half of the rows of symbols in the universal constellation 1100, so each subset provides only 8 options along the vertical axis representing the quadrature dimension. This results in the quadrature channel carrying 3 bps, but with improved tolerance to noise and interference and thus the ability to operate more accurately at lower SINR levels.

If the highest level the user link SINR and feeder link SINR can support is 8PSK (e.g., 3 bps) which is checked in step 1309, three bits are mapped to either the I or Q channel (step 1314). For example, if the three bits are mapped to the Q channel, the subsets shown in FIG. 11A can be used, and if the three bits are mapped to the I channel, the subsets in FIG. 11B can be used. For whichever of the Q channel and the I channel is has three bits mapped, the system alternates which of two subsets of universal constellation used, so that the subset changes for each symbol transmitted.

If the highest level the user link SINR and feeder link SINR can support is QPSK (e.g., 2 bps), which is checked in step 1310, then the bitstream provides only 2 bps. The gateway can fill one bit position with a randomly or pseudo-randomly generated value for each symbol, to provide a total of three bits to be used in selecting a feeder link symbol, even though only two of the bits are user datastream bits to be transmitted on the user link. The mapping to the universal constellation 1100 can be done with subsets as discussed above for 8PSK, but using the three bits determined as 2 bits of data and one random bit value.

Similarly, if the highest level the user link SINR and feeder link SINR can support is BPSK (e.g., 1 bps), which is checked at step 1311, then the gateway can fill in randomly or pseudo-randomly generated bit values for two bit positions (step 1313), resulting again in 3 bps to map to a channel (step 1314). The mapping to the universal constellation 1100 can be done as discussed above for 8PSK, but using the three bits determined as 1 bit of data and two random bit values.

In step 1315, the gateway forms the feeder link 256-QAM constellation by combining the I and Q channels. In the example, the I and Q channels are assigned separately for different user data links. In other words, the I channel carries up to 4 bits for a first user link and the Q channel carries up to 4 bits for a second user channel.

Due to the nature of the symbol constellation 1100 and the independence of the I channel and the Q channel, the gateway can map the user links to their channels separately, and then combine the values or positions for the I and Q channels to determine which symbol in the feeder link constellation 1100 to transmit. In other words, the subset of symbols used to select a given symbol transmission can result from separately restricting the Q values that are available (e.g., skipping rows) and/or restricting the I values that are available (e.g., skipping columns), which may result in the subsets of any of FIG. 11A, 11B, or 12. Thus, the gateway can determine the position along the I and Q axes separately for each channel, and then combine the two positions to determine the symbol to use.

For example, using the ACM MODCODE tables and the determinations in steps 1308 to 1311, the user link assigned to the I channel may be assigned a modulation of 8PSK, QPSK, or BPSK, which would result in 3 bits per symbol mapped according to step 1314. The fourth bit would be determined by alternating between two subsets of I channel positions (e.g., between different sets of columns as illustrated in FIG. 11B). Similarly, the user link assigned to the Q channel may also be assigned a modulation of 8PSK, QPSK, or BPSK, which would result in 3 bits per symbol mapped according to step 1314. The fourth bit would be determined by alternating between two subsets of Q channel positions (e.g., between different sets of rows as illustrated in FIG. 11B). Together, the alternation of subsets of both I channel positions and Q channel positions would result in the behavior discussed for FIG. 12, where effectively the symbols are selected from 64-symbol subsets, because both the I channel and Q channel are restricted to half of their positions in the universal constellation 1100.

In step 1316, the gateway calculates its total forward capacity. The process then returns to step 1302, where the feeder link SINR is checked again in step 1302 and the process 1300 continues.

In addition, the gateway can determine the user link MODCODE again each time the recipient terminal for a user link changes, such as when TDMA time slot assignments change which terminal in a user beam is designated to receive data. As a result, the gateway repeatedly updates the user link MODECODEs to remain appropriate for each user link, even as different terminals in a beam are allocated time slots and/or when user link SINR changes.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

The invention claimed is:

1. A gateway for a satellite communication system, comprising:
   a data input interface configured to receive (i) a first bitstream for transmission on a first forward link from a satellite to a first terminal and (ii) a second bitstream for transmission on a second forward link from the satellite to a second terminal;
   a modulator configured to map data to symbols for transmission on a feeder link for transmissions from the gateway to the satellite, wherein the modulator is configured to use a same symbol constellation to modulate data for transmission on the feeder link to achieve each of multiple different numbers of bits per symbol, including by selecting symbols for transmission from among different subsets of the symbols in the symbol constellation to achieve different numbers of bits per symbol,
   wherein the modulator is configured to (i) select data to map to a symbol for transmission on the feeder link, the selected data including a portion of the first bitstream and a portion of the second bitstream, and (ii) select a symbol to represent the selected data in a transmission on the feeder link, the symbol being selected from among a subset of the symbols in the symbol constellation and the subset is determined based at least in part on a measure of signal strength for the feeder link; and
   a transmitter to transmit the selected symbol on the feeder link from the gateway to the satellite.

2. The gateway of claim 1, wherein the gateway is configured to remove start-of-frame (SOF) field values from the first bitstream and the second bitstream; and
   wherein the gateway is configured to insert, in place of the SOF field values, replacement SOF field values that indicate modulations to use in transmitting data on the forward links.

3. The gateway of claim 2, wherein the gateway is configured transmit frames having a same frame length, such that beginning positions of frames for the first bitstream and the second bitstream are aligned in the feeder link; and
   wherein the replacement SOF field values are feeder link SOF field values, and the gateway is configured to use a single feeder link SOF field value in place of a first SOF field value for the first bitstream and a second SOF field value for the second bitstream,
   wherein the feeder link SOF field values are selected from among a set of multiple different predetermined feeder link SOF field values, wherein each of at least some of the predetermined feeder link SOF field values represent different modulations to be used for the forward links.

4. The gateway of claim 2, wherein the gateway is configured transmit frames having a same code length, such that a length of codewords is the same for the forward links; and
   wherein the replacement SOF field values are modulation-indicating field values, and the gateway is configured to replace individual SOF field values with modulation-indicating SOF field values, wherein the modulation-indicating SOF field values for different forward links transmitted at different times in at least some of the transmissions on the feeder link.

5. The gateway of claim 1, wherein the data input interface is configured to receive more than two bitstreams for transmission on separate forward links from the satellite; and
   wherein the modulator is configured to map data from the more than two bitstreams to symbols for transmission on the feeder link, such that individual symbols transmitted on the feeder link include data from each of the more than two bitstreams.

6. The gateway of claim 1, wherein the measure of signal strength is a measure of signal-to-noise ratio (SNR) or signal-to-interference-and-noise ratio (SINK).

7. The gateway of claim 1, wherein the gateway is configured to transmit symbols on the feeder link in a transmodulation system in which transmissions on the feeder link are used by the satellite to transmit data on the first forward link and/or the second forward link, wherein the transmission on the feeder link is made using a modulation that is different from modulations concurrently used for the first forward link and the second forward link.

8. The gateway of claim 1, wherein the first forward link is provided by a first beam of the satellite and the second forward link is provided by a second beam of the satellite.

9. The gateway of claim 1, wherein the gateway comprises one or more processors configured to (i) determine a first number of bits per symbol used in a modulation for the first forward link and (ii) determine a second number of bits per symbol used in a modulation for the second forward link; and
   wherein the modulator is configured to determine the subset of the symbols of the symbol constellation based in part on the determined first number of bits per signal and the determined second number of bits per symbol.

10. The gateway of claim 1, wherein the gateway comprises one or more processors configured to (i) select a first modulation for transmission of the first bitstream on the first forward link based on a measure of signal strength for the first forward link and (ii) select a second modulation for transmission of the second bitstream on the second forward link based on a measure of signal strength for the second forward link; and
    wherein the gateway is configured to specify, in a transmission on the feeder link, the selected first modulation for the first forward link and the selected second modulation for the second forward link.

11. The gateway of claim 1, wherein the symbol constellation is for a modulation providing a maximum of a first number of bits per symbol, and the system is configured to approximate multiple lower-order modulations that provide fewer than the first number of bits per symbol using proper subsets of the symbols in the symbol constellation.

12. The gateway of claim 1, wherein the symbol constellation provides a maximum number of bits per symbol, and wherein the modulator is configured to select from different subsets of the symbols in the symbol constellation to approximate transmission with modulations having less than the maximum number of bits per symbol.

13. The gateway of claim 12, wherein the subsets used to approximate transmission with modulations having less than the maximum number of bits per symbol each omit rows and/or columns of the symbol constellation to provide space between symbols included in the subset.

14. The gateway of claim 12, wherein, to achieve a number of bits per symbol lower than the maximum number of bits per symbol, the modulator is configured to map data to symbols in a manner that alternates between selecting from different distinct subsets of the symbol constellation.

15. The gateway of claim 1, wherein the symbol constellation is a symbol constellation for quadrature amplitude modulation (QAM) having a particular number of symbols and providing a maximum of a particular number of bits per symbol;

wherein the modulator is configured to selectively modulate data for transmission on the feeder link using fewer than the particular number of bits per symbol, including by:

modulating data using the symbol constellation to provide one bit per symbol less than the particular number of bits per symbol when first criteria for the signal strength of the feeder link are satisfied, including by alternating among selection of symbols for transmission on the feeder link from among first non-overlapping subsets of the symbols in the symbol constellation, wherein each of the first non-overlapping subsets have half of the particular number of symbols; and modulating data using the symbol constellation to provide two bits per symbol less than the particular number of bits per symbol when second criteria for the signal strength of the feeder link are satisfied, including by alternating among selection of symbols for transmission on the feeder link from among second non-overlapping subsets of the symbols in the symbol constellation, wherein each of the second non-overlapping subsets have one quarter of the particular number of symbols.

16. The gateway of claim 1, wherein the symbol constellation has an unequal spacing of symbols in which amounts of spacing between symbols increase as distance increases from a center of the constellation.

17. A method performed by a gateway of a satellite communication system, the method comprising:

receiving, by the gateway, (i) a first bitstream for transmission on a first forward link from a satellite to a first terminal and (ii) a second bitstream for transmission on a second forward link from the satellite to a second terminal;

selecting, by the gateway, data to map to a symbol for transmission on a feeder link for transmissions from the gateway to the satellite, and wherein the selected data includes a portion of the first bitstream and a portion of the second bitstream;

selecting, by the gateway, a symbol to represent the selected data in a transmission on the feeder link, the symbol being selected from among a subset of the symbols in a symbol constellation and the subset is determined based at least in part on a measure of signal strength for the feeder link, wherein the gateway is configured to use the symbol constellation to modulate data for transmission on the feeder link to achieve different numbers of bits per symbol, and wherein the gateway is configured to select symbols for transmission from among different subsets of the symbols in the symbol constellation to achieve different numbers of bits per symbol; and transmitting, by the gateway, the selected symbol on the feeder link from the gateway to the satellite.

18. The method of claim 17, wherein the measure of signal strength is a measure of signal-to-noise ratio (SNR) or signal-to-interference-and-noise ratio (SINK).

19. The method of claim 17, wherein the gateway is configured to transmit symbols on the feeder link in a transmodulation system in which transmissions on the feeder link are used by the satellite to transmit data on the first forward link and/or the second forward link, wherein the transmission on the feeder link is made using a modulation that is different from modulations concurrently used for the first forward link and the second forward link.

20. One or more non-transitory computer-readable media storing instructions that are operable, when executed be one or more processors of a gateway of a satellite communication system, to cause the gateway to perform operations comprising:

receiving (i) a first bitstream for transmission on a first forward link from a satellite to a first terminal and (ii) a second bitstream for transmission on a second forward link from the satellite to a second terminal;

selecting data to map to a symbol for transmission on a feeder link for transmissions from the gateway to the satellite, and wherein the selected data includes a portion of the first bitstream and a portion of the second bitstream;

selecting a symbol to represent the selected data in a transmission on the feeder link, the symbol being selected from among a subset of the symbols in a symbol constellation and the subset is determined based at least in part on a measure of signal strength for the feeder link, wherein the gateway is configured to use the symbol constellation to modulate data for transmission on the feeder link to achieve different numbers of bits per symbol, and wherein the gateway is configured to select symbols for transmission from among different subsets of the symbols in the symbol constellation to achieve different numbers of bits per symbol; and transmitting the selected symbol on the feeder link from the gateway to the satellite.

* * * * *

UNITED STATES PATENT AND TRADEMARK OFFICE
CERTIFICATE OF CORRECTION

| | |
|---|---|
| PATENT NO. | : 12,483,325 B2 |
| APPLICATION NO. | : 18/140663 |
| DATED | : November 25, 2025 |
| INVENTOR(S) | : Liping Chen et al. |

It is certified that error appears in the above-identified patent and that said Letters Patent is hereby corrected as shown below:

In the Claims

In Column 42, Claim 6, Line 26, please delete "SINK" and insert -- SINR --

In Column 44, Claim 18, Line 19, please delete "SINK" and insert -- SINR --

Signed and Sealed this
Tenth Day of February, 2026

John A. Squires
*Director of the United States Patent and Trademark Office*